May 30, 1972     D. F. WINNEK     3,666,465
HALF TONE REPRODUCTION OF STEREOSCOPIC PHOTOGRAPHS
Filed Oct. 19, 1967     15 Sheets-Sheet 8
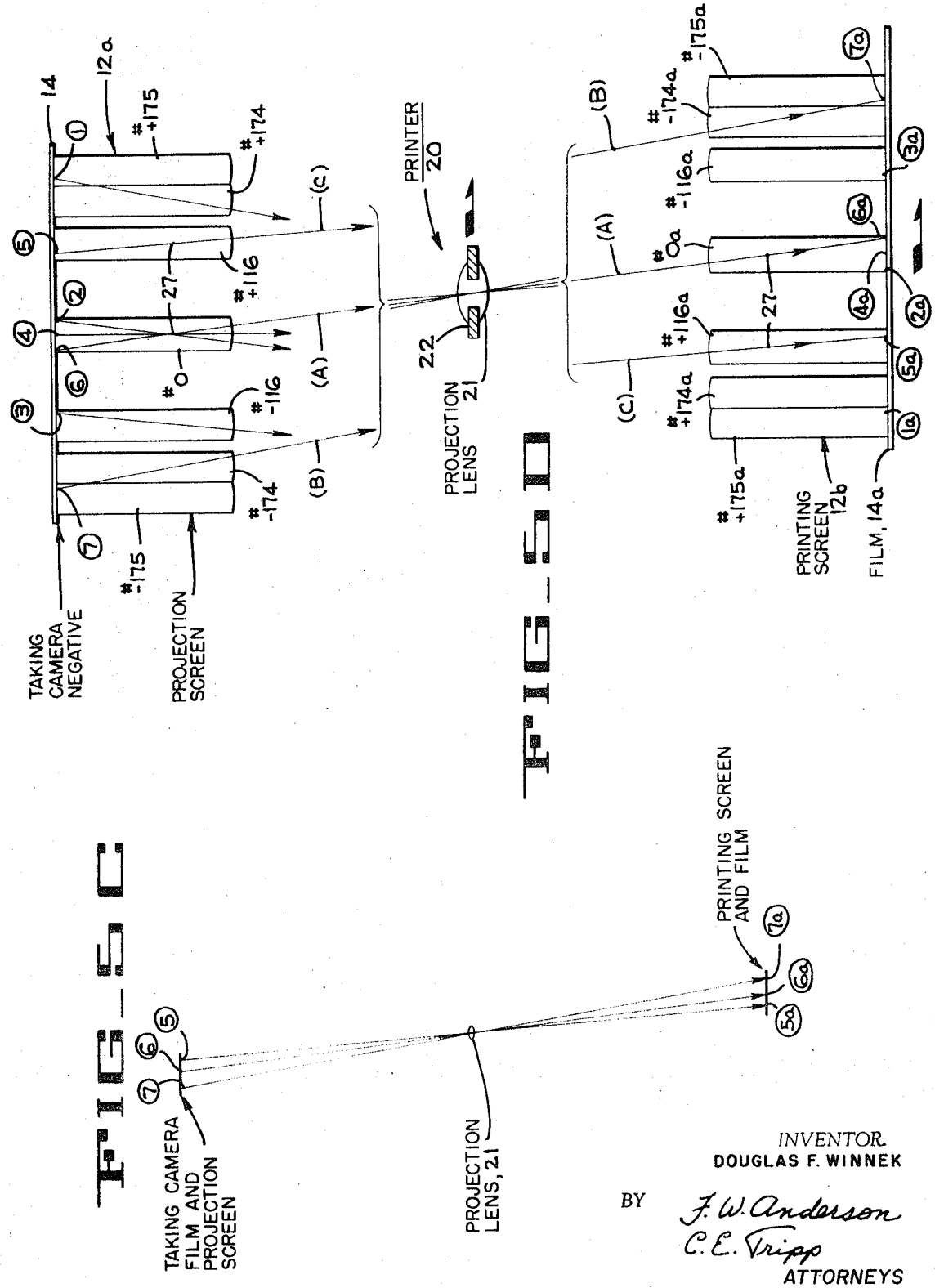
INVENTOR.
DOUGLAS F. WINNEK
BY F. W. Anderson
C. E. Tripp
ATTORNEYS

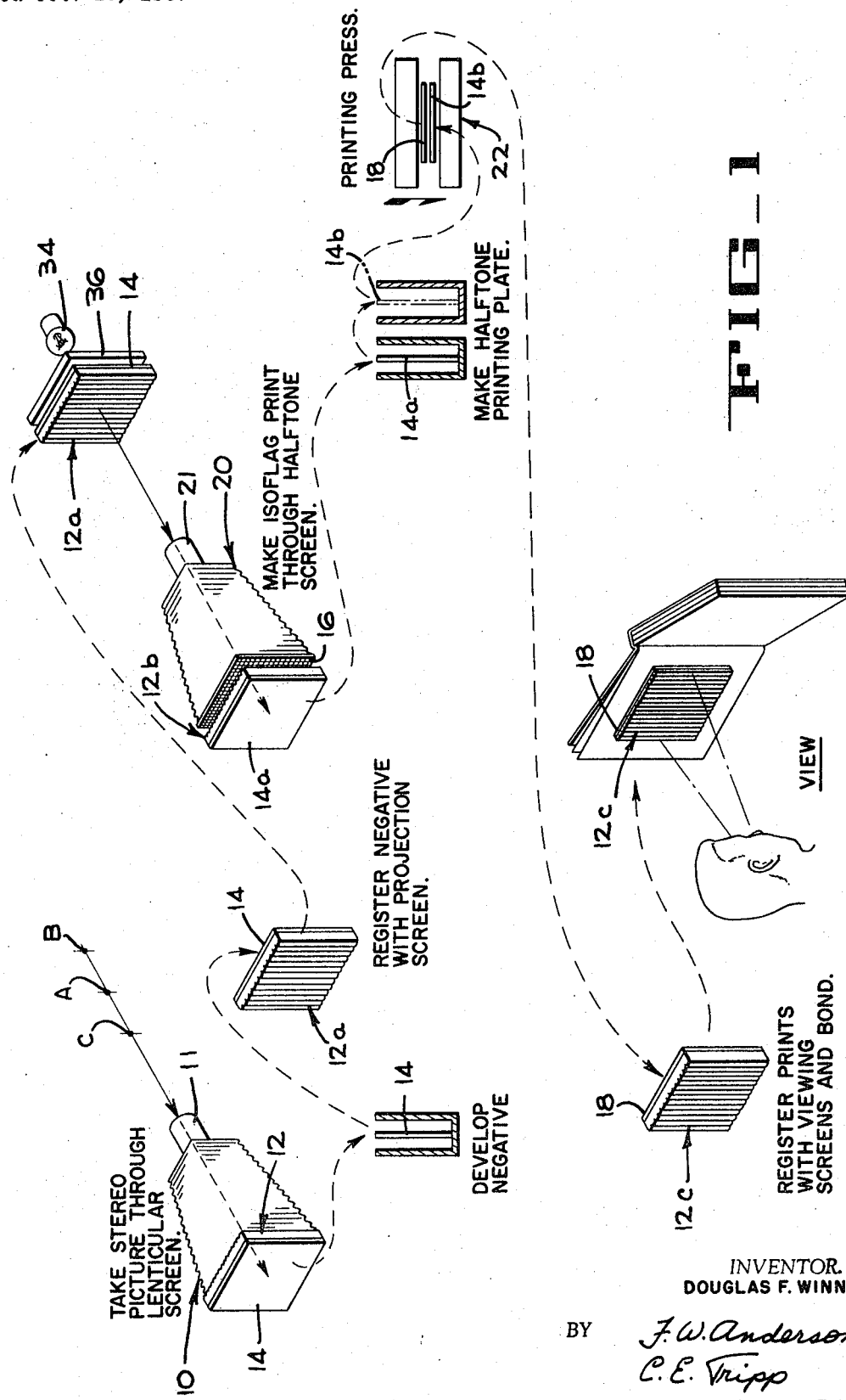

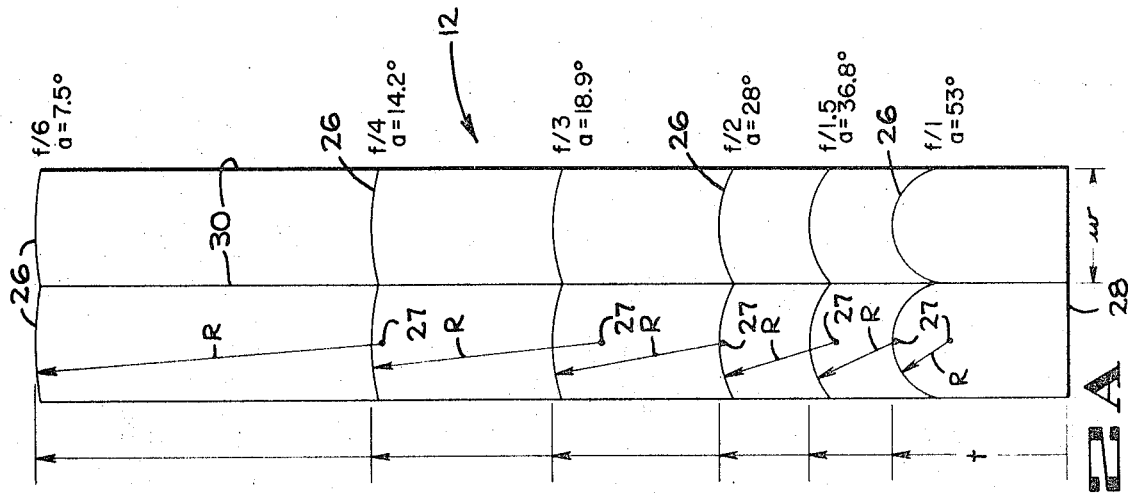
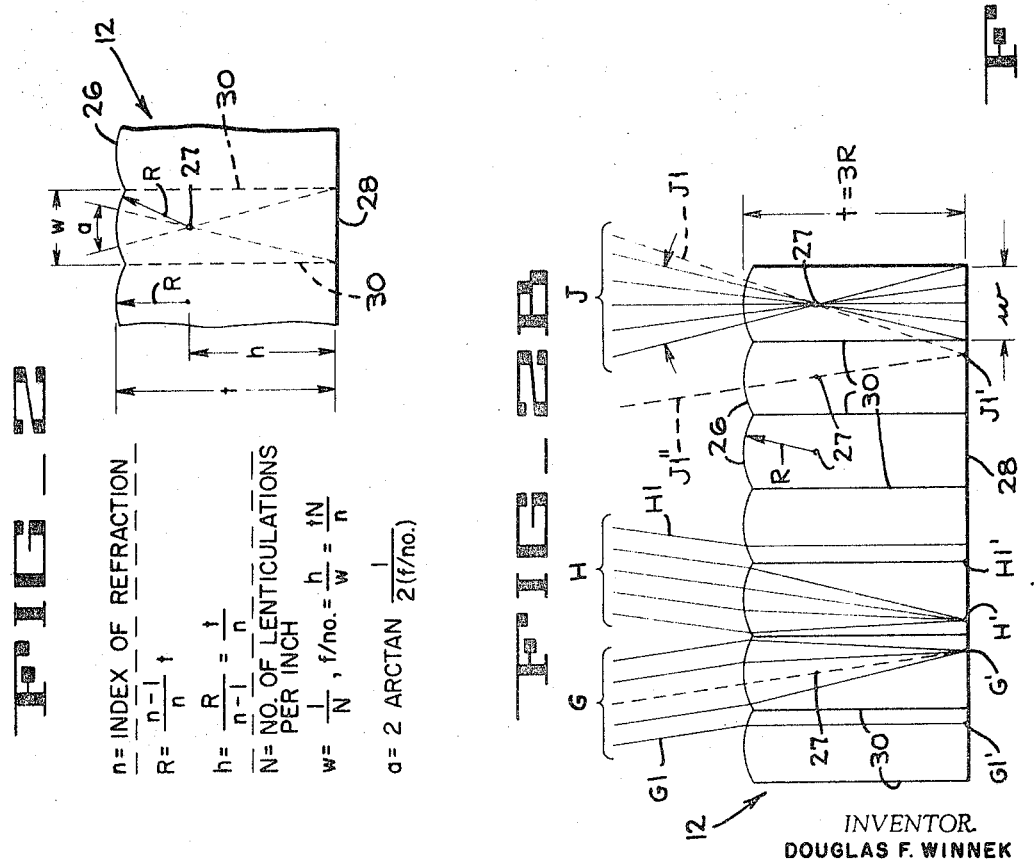

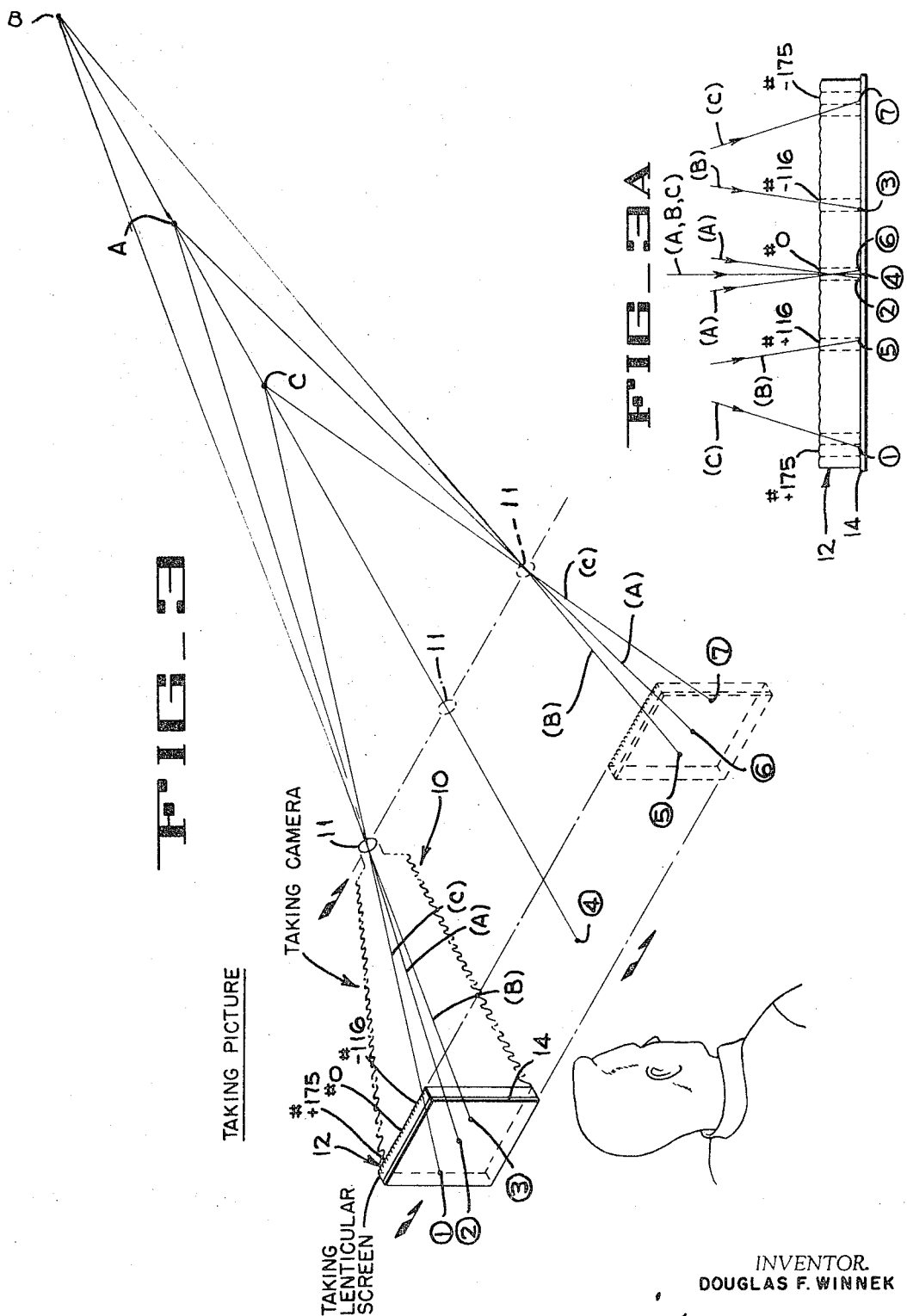

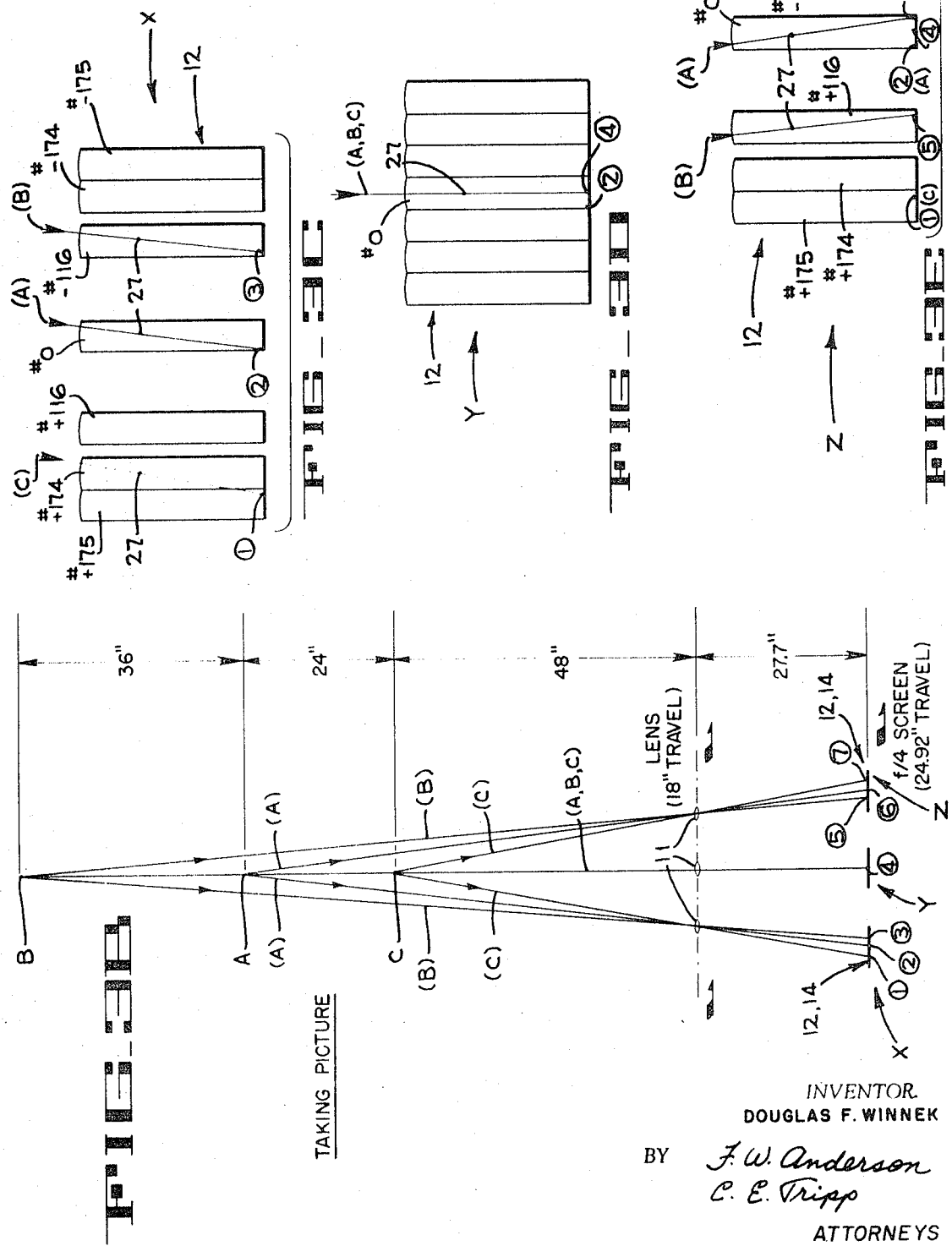

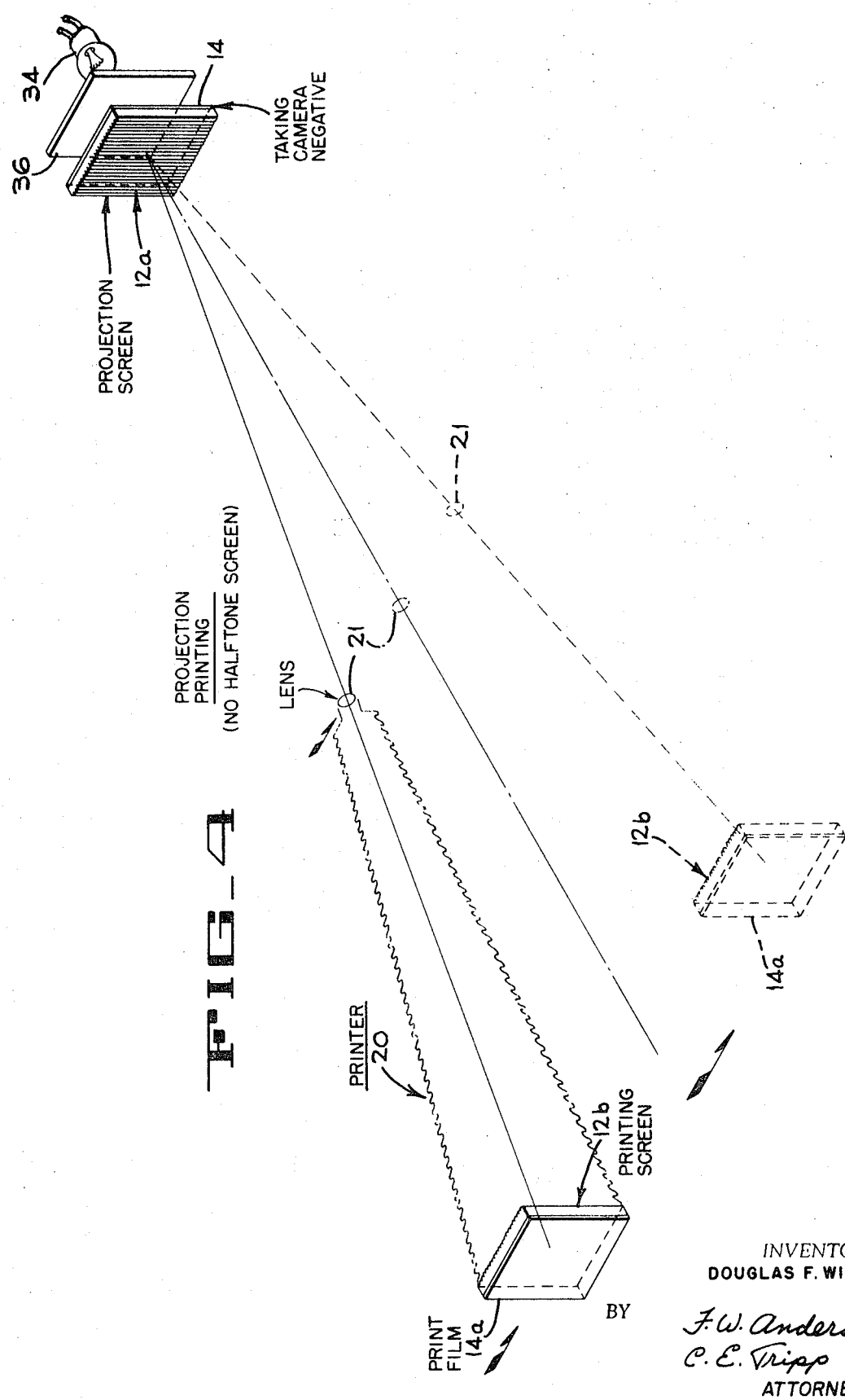

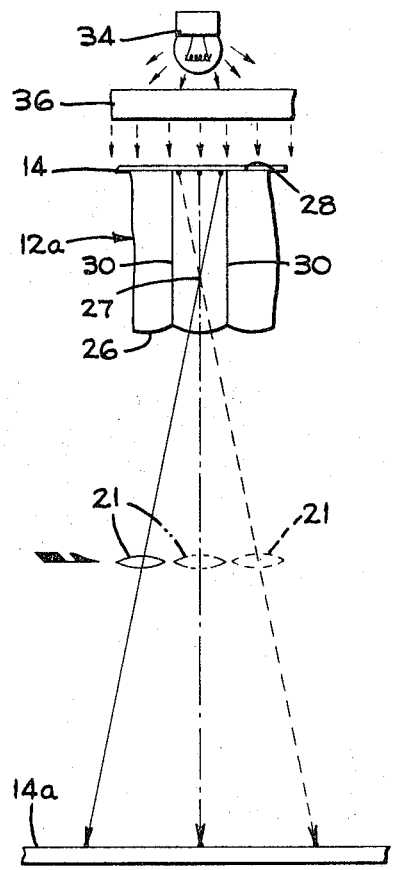
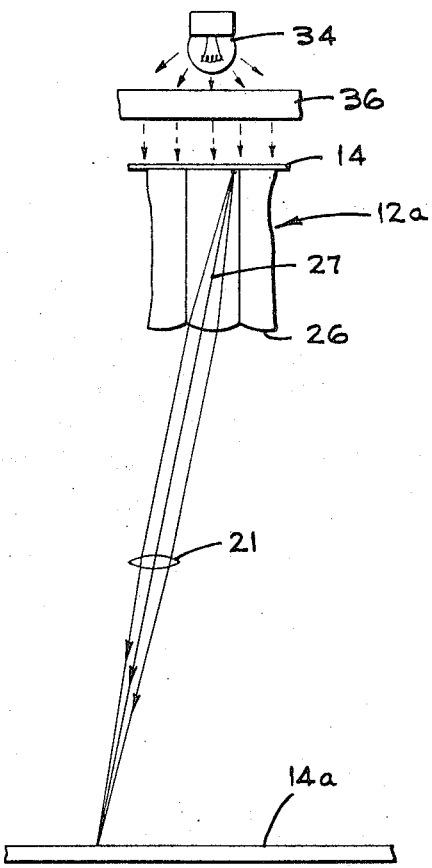
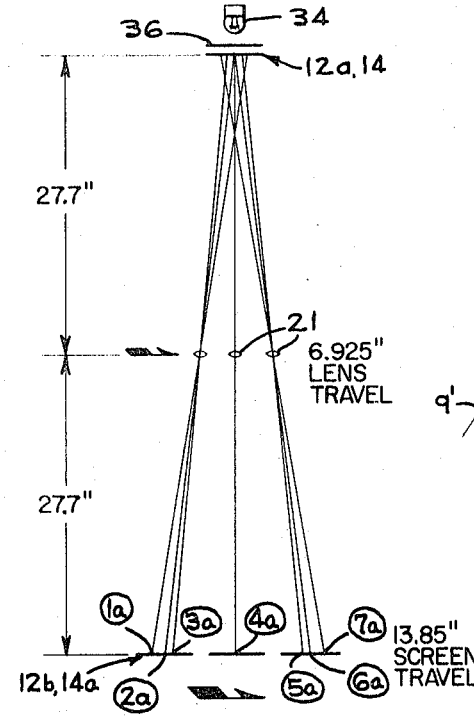
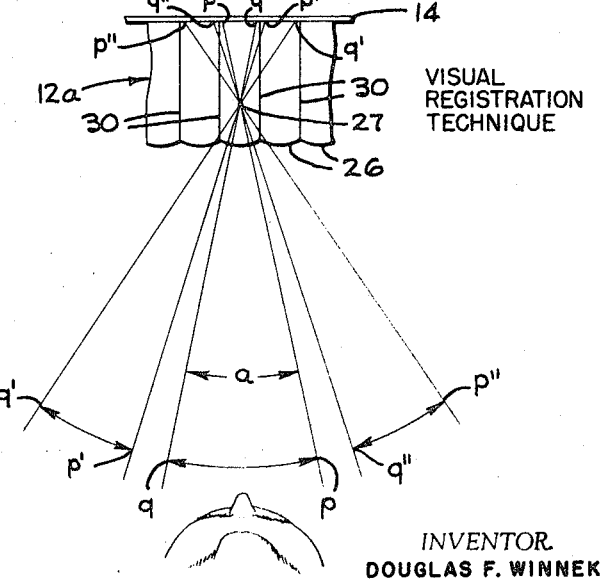

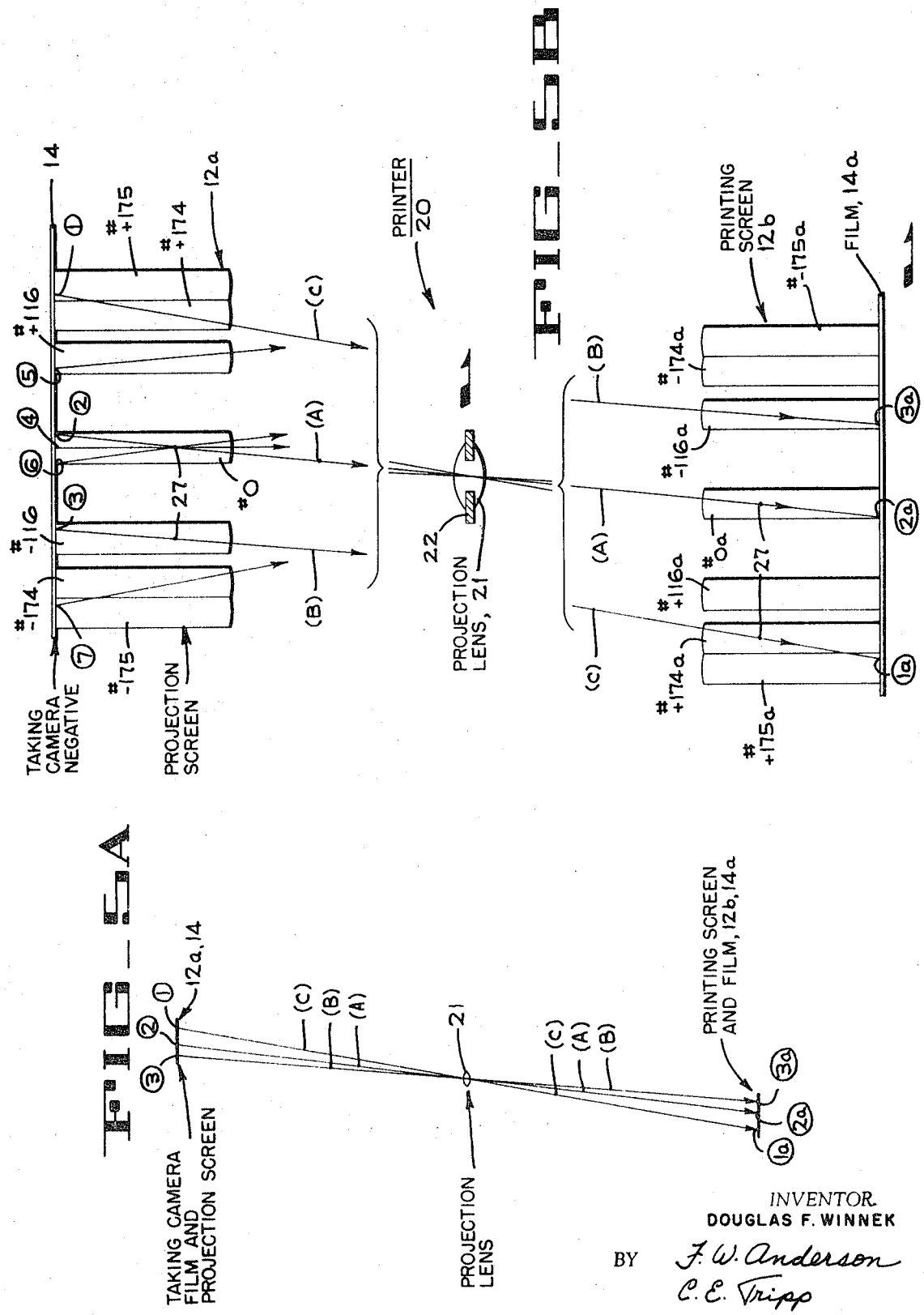

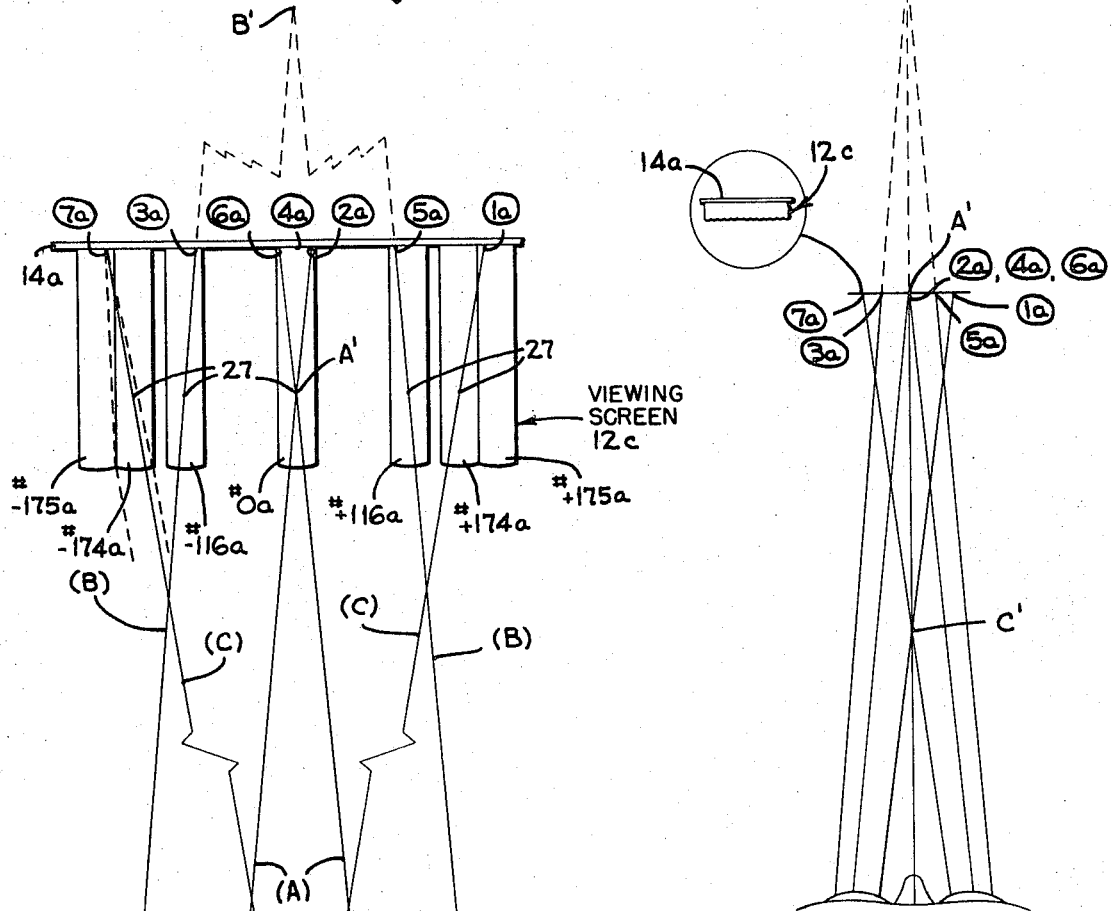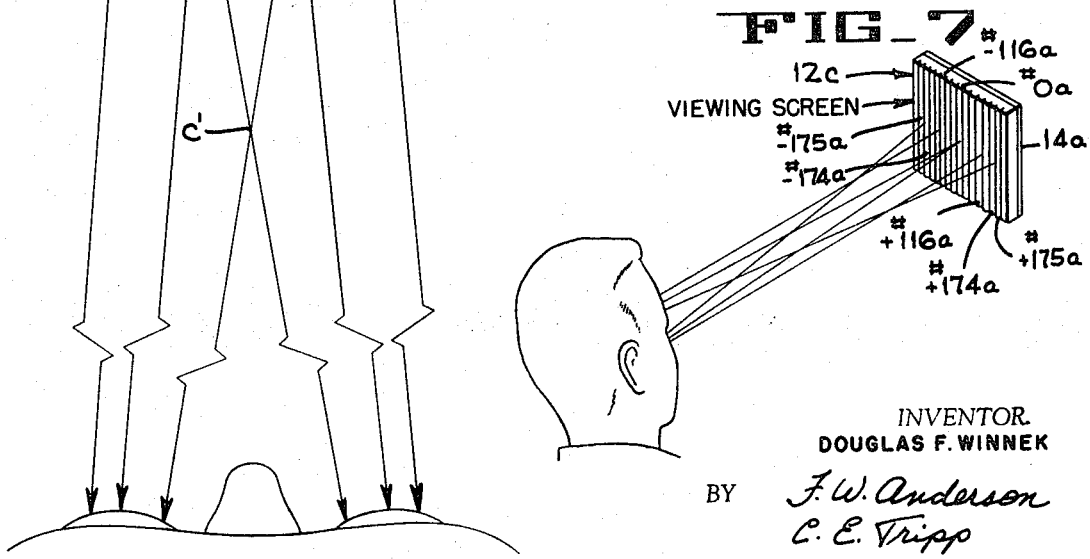

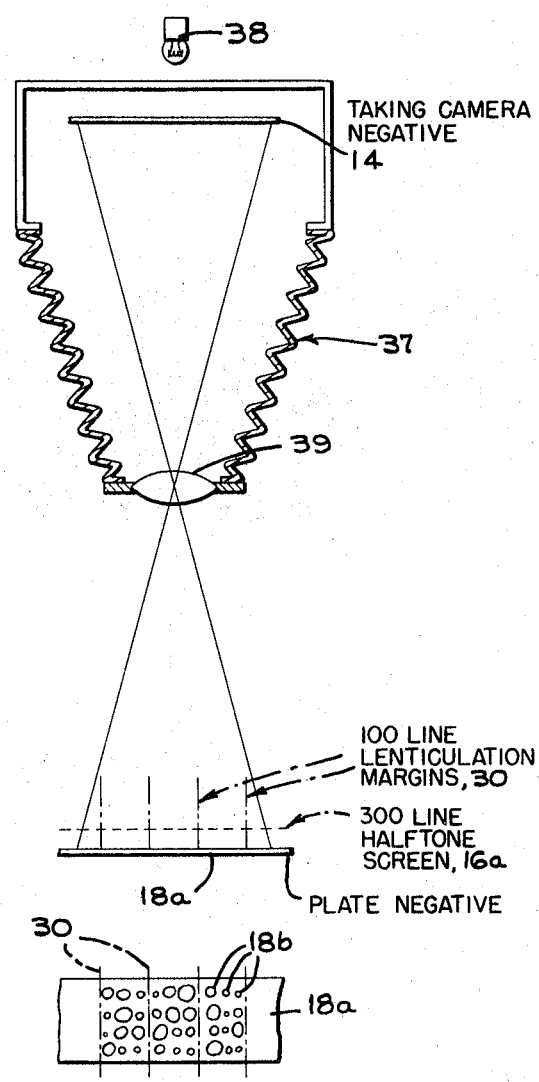
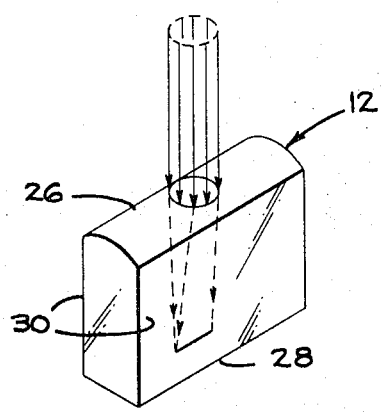
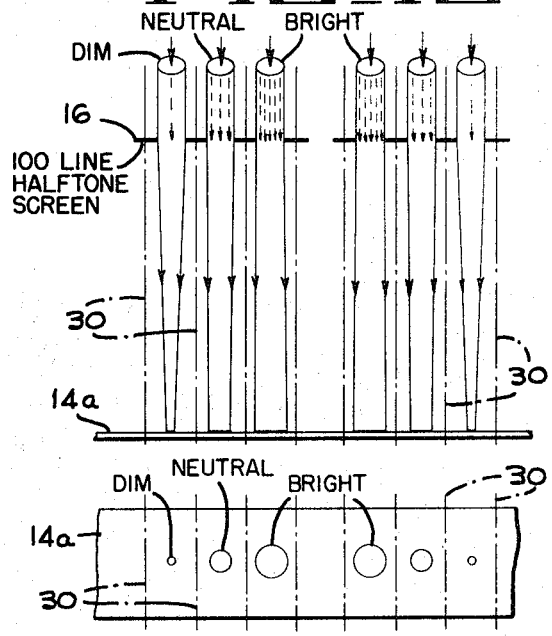
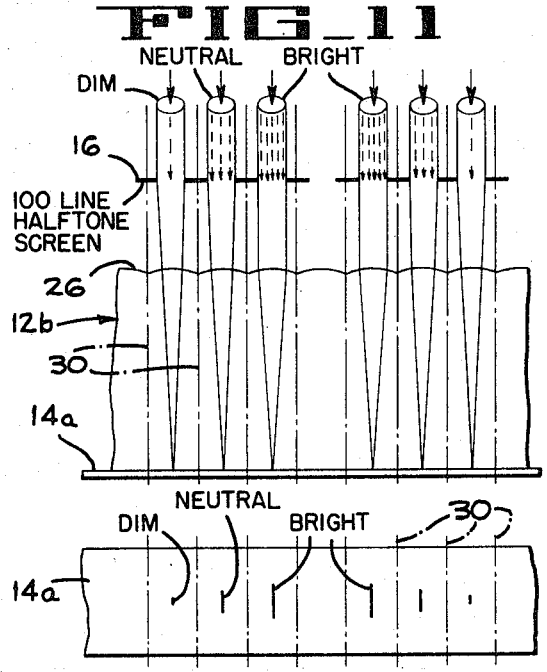

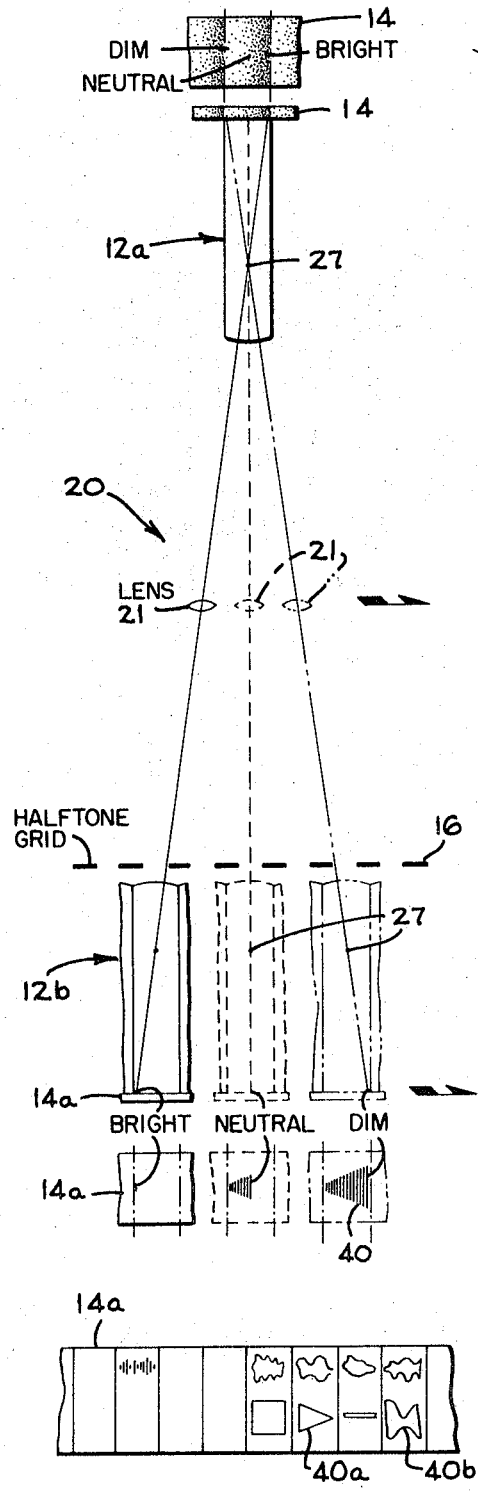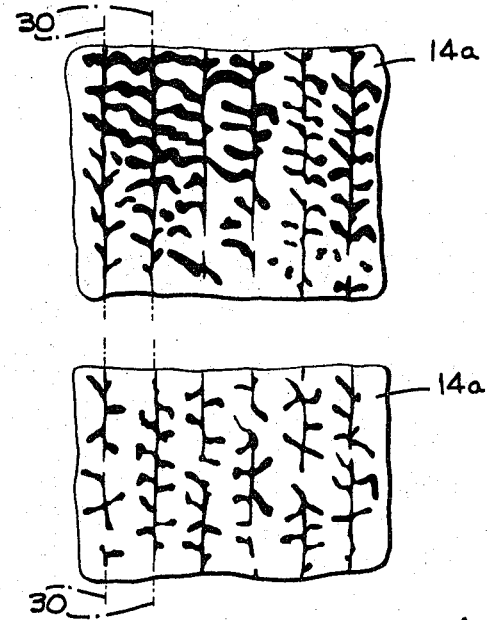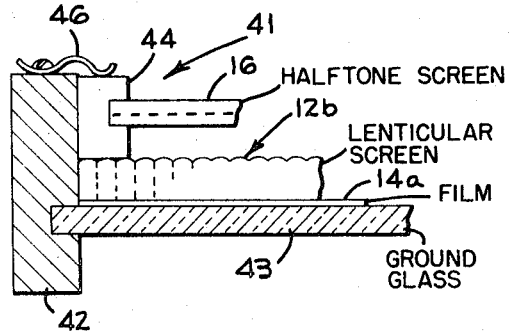

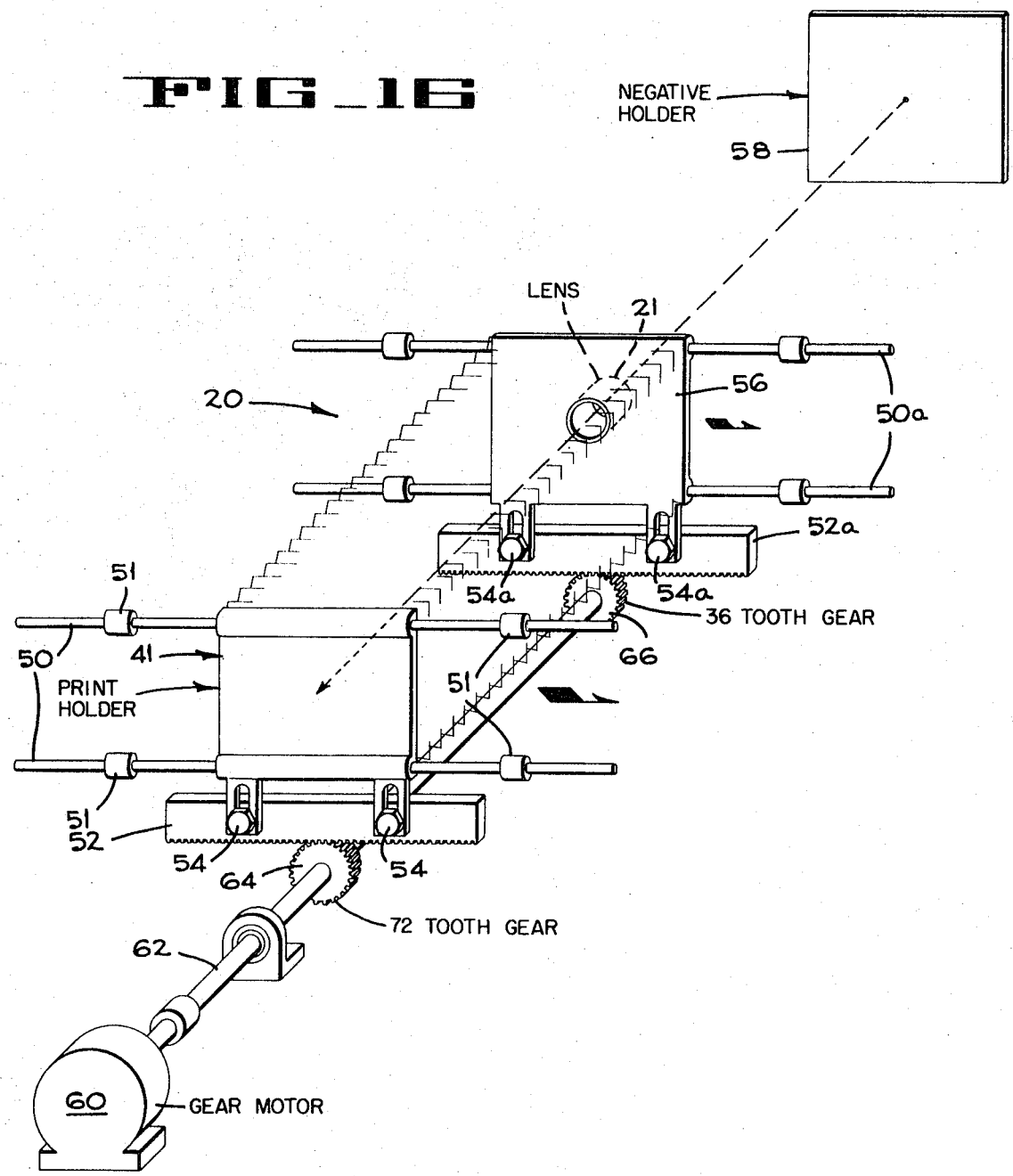

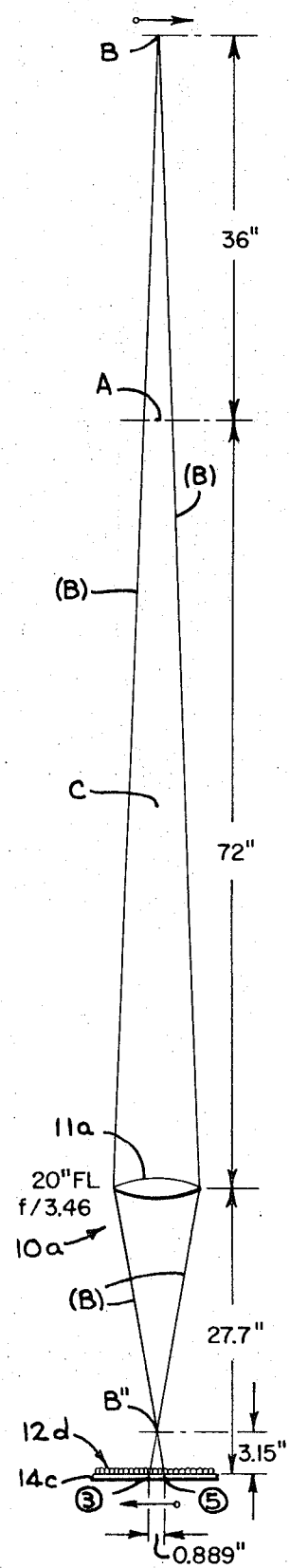
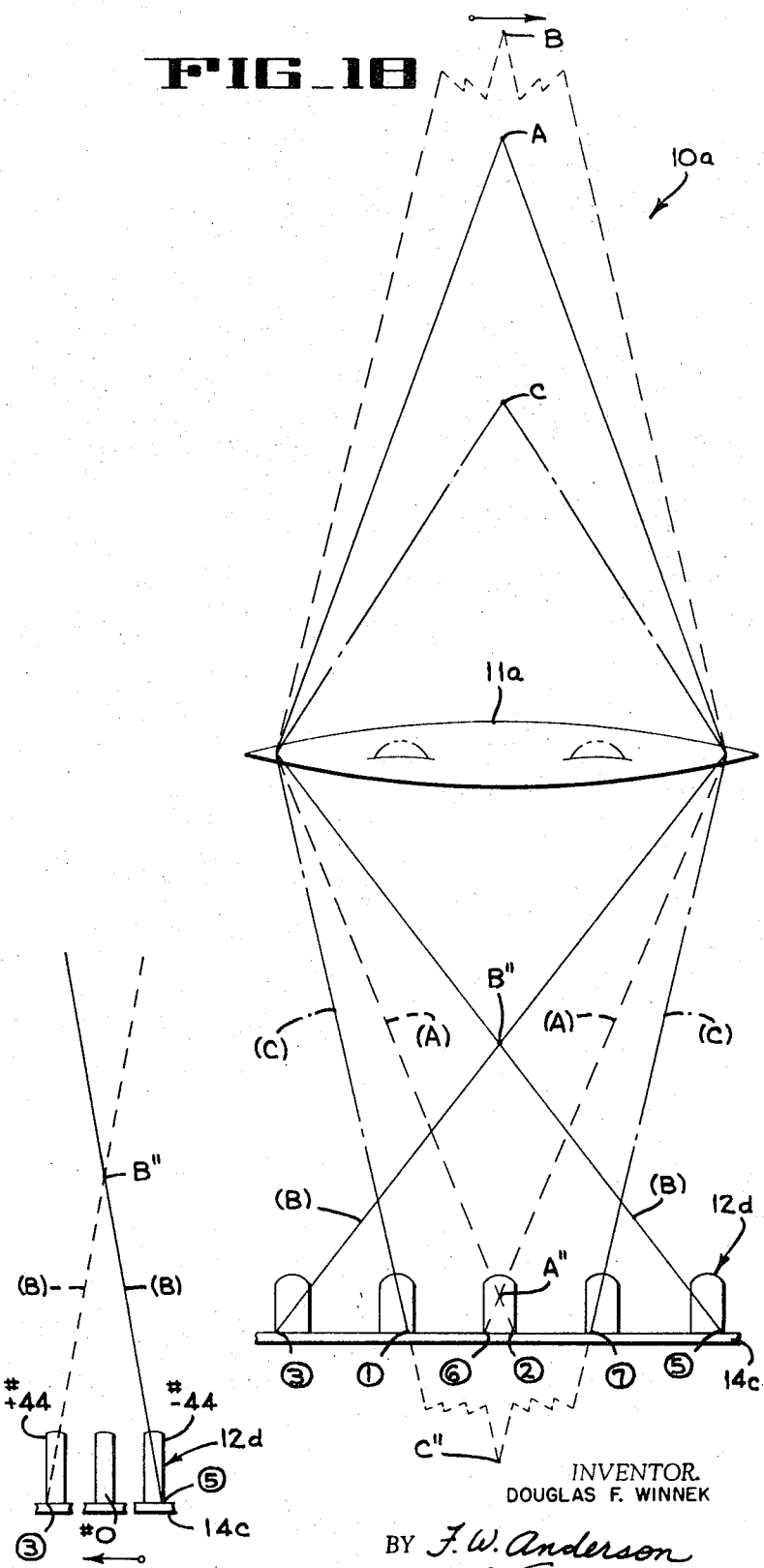

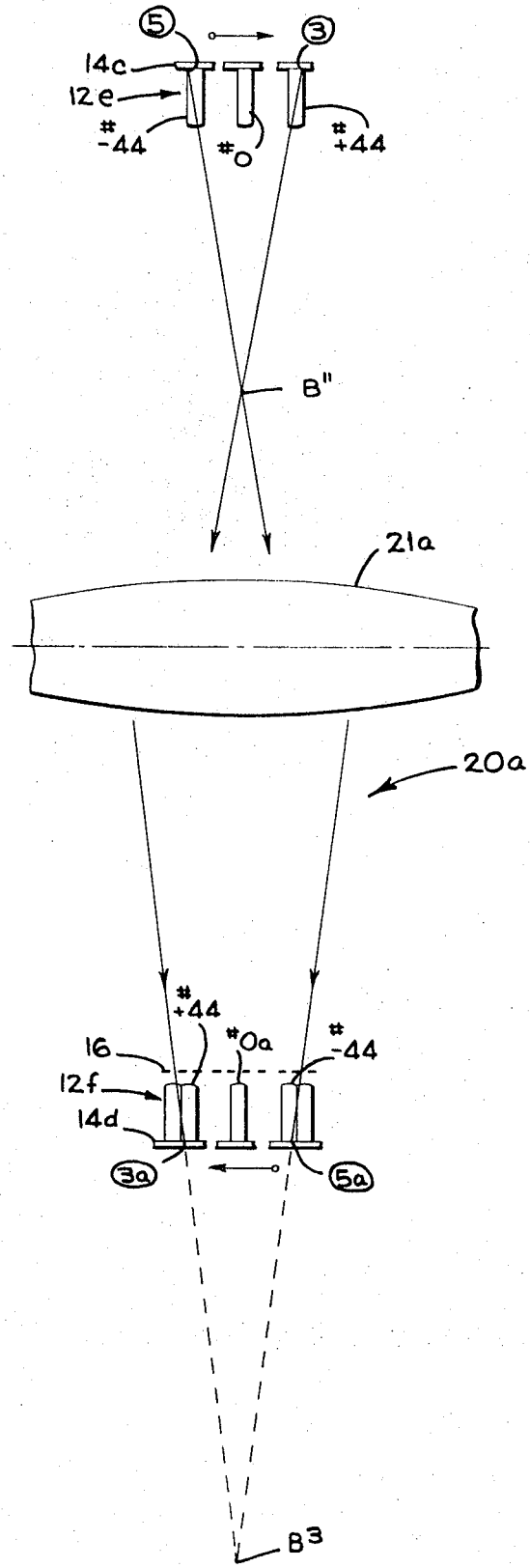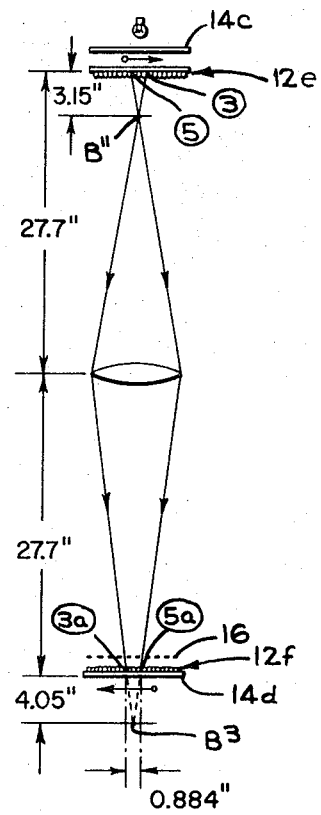

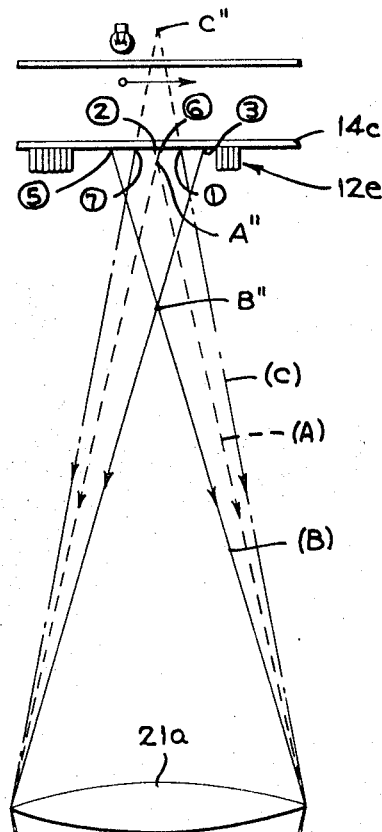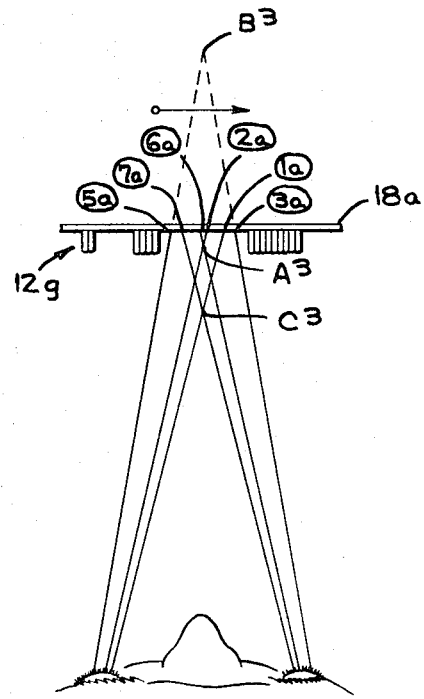
FIG_21
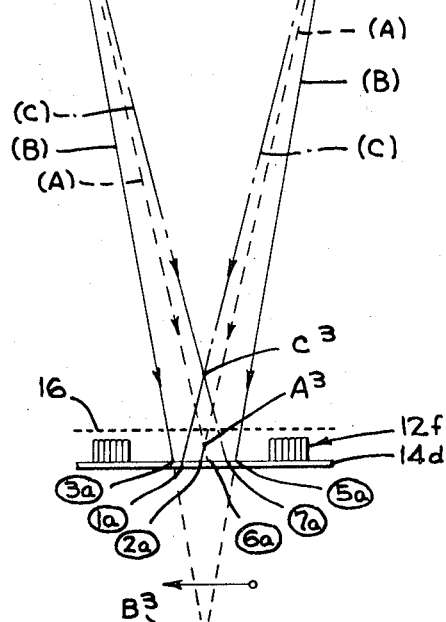
FIG_20

United States Patent Office 3,666,465
Patented May 30, 1972

3,666,465
HALF TONE REPRODUCTION OF STEREOSCOPIC PHOTOGRAPHS
Douglas F. Winnek, Palo Alto, Calif.
(10450 W. Loyola Drive, Los Altos Hills, Calif. 94022)
Filed Oct. 19, 1967, Ser. No. 676,484
Int. Cl. G03f 5/00; G03c 9/00
U.S. Cl. 96—45                                    8 Claims

ABSTRACT OF THE DISCLOSURE

A printing plate film for printing stereoscopic pictures to be viewed through a vertical lenticular screen is produced by taking a stereoscopic camera negative through a small aperture lens with a screen in front of the film. The scene is scanned across the interpupilary angle with a mechanical scanning camera. A projection lenticular screen is placed in front of the camera negative and the latter is printed through a grid type halftone screen in front of a printing lenticular screen and the sensitive plate film. A mechanical scanning printer having a small aperture lens produces "isoflags" on the printing plate film. The height of the isoflags at any point is proportional to the brightness of the corresponding original image; and the plate is prepared from the plate film for printing the isoflags by any conventional printing method, such as letter press, gravure, lithography, etc. screen to re-establish the original scene as a three dimensional picture.

A method is also described wherein wide lens taking and projection cameras are employed.

CROSS REFERENCE TO RELATED APPLICATIONS

Winnek application, Ser. No. 525,572, filed Feb. 7, 1966, discloses and claims a projection printing process using lenticular screens which are relatively inclined in their respective planes in order to minimize moire' patterns.

Winnek 2,562,077 discloses the use of a low f/number (wide lens), non-scanning camera for taking stereoscopic photographs using a lenticular screen, and also discloses how to convert the resultant pseudoscopic camera negatives into true (orthoscopic) pictures.

Meyer 2,914,407 teaches the production of stereo pictures using polarized picture halves viewed through polarized glasses. A "halftone" line screen interposed between a reversed lenticular film and a negative to be copied, with the lines of the screen perpendicular to the lenticulations.

Howe 3,161,509 recognizes the problems introduced in attempts to use ordinary halftone plate making processes for stereo pictures formed with lenticular screens, in that an unacceptably fine halftone screen is required, because if the width of a stereo dot approaches that of a lenticule the stereo discrimination is small. The solution proposed is the use of line halftones for printing the image having a width only slightly smaller than the width of the lenticules and extending perpendicular to the latter. No scanning for the production of isoflags with a regular type halftone screen in projection printing is described.

SUMMARY OF THE INVENTION

The ultimate benefit of this invention lies in the production of a printing plate resulting from a stereoscopic camera and projection printing technique of the type wherein a lenticular screen is employed in the taking camera, as well as in front of the ultimately printed picture, for viewing the latter.

A printing plate is produced for making prints which give a true three dimensional, stereoscopic picture when viewed through a lenticular screen. Printing plates of this type have heretofore required the use of a very fine halftone screen (e.g. 300 lines/inch) and therefore limited by commercial practice to the lithographic process, and even so only a relatively few bits of stereo information are provided behind a lenticulation of the viewing lenticular screen by each aperture in the halftone screen.

On the other hand the plates of present invention can be letter press, gravure, lithographic or other normal printing plates since coarser halftone screens can be used while retaining the full 3-D effect.

In accordance with the present invention, the image behind each lenticulation formed by light passing through an aperture in the halftone screen grid is a band or continuum of vertical line images. The continuum of images in each band that was behind a halftone screen aperture and a lenticulation during projection printing, will, for sake of convenience, be referred to as an "isoflag." Each line image in an isoflag represents a view of the original scene from a particular scanning angle. The scanning angles for all lenticulations total to a viewing angle having a base line of a length comparable to or preferably greater than the interpupilary distance of the eyes. Scanning during both taking the picture and projection printing it can be either mechanical or optical (wide lens scanning).

The vertical dimension (that along a lenticulation) of each line image making up an isoflag is proportional to the intensity and exposure time of the light projected through the corresponding aperture in the halftone screen.

The process of making the plate film or plate copy will not be described since the plate is made from the plate film by known methods.

The preferred method of forming a plate film bearing isoflags involves the use of mechanical scanning taking and projection cameras. The original scene is exposed through a small aperture lens which exposes the negative through a lenticular screen. Both lens and the film-screen sandwich are moved uniformly during exposure at rates proportional to their respective distances from the focal plane of the scene. The optics of the taking camera is such that in sweeping through the scanning angle, the images formed by a central (optical axis) object in the camera focal plane fill a band of the camera negative behind the central lenticulation.

The camera negative is printed through a projection lenticular screen of the same pitch as that used in the taking camera. The plate film on which isoflags are to be formed is placed behind a printing lenticular screen and the latter, in turn, is placed behind a conventional grid type halftone screen. The light projected through each halftone screen aperture, as modified by the lenticular printing screen, produces the isoflags during scanning.

Instantaneous taking and projection cameras having wide lens can also be used to produce isoflags. The camera lens should have large horizontal apertures, corresponding to the interpupilary distance between the eyes, or preferably more for good three dimensional effect. The taking camera forms "pseudoscopic" negatives, that is, negatives wherein near objects appear far away and vice versa. However, a true or orthoscopic plate is produced by selection of the projection printer optics.

BRIEF DESCRIPTION OF THE DRAWINGS

FIG. 1 is a schematic flow diagram illustrating a process for printing three dimensional pictures under the invention.

FIG. 2 is an optical diagram showing various critical dimensions of a lenticular screen.

FIG. 2A is a diagram drawn to relative scale showing the viewing angles and F numbers of variously proportioned lenticulations.

FIG. 2B is an optical diagram showing how a bundle of parallel rays is acted upon by the screen and how a bundle of rays passing through the center of curvature act.

FIG. 3 is a perspective diagram illustrating the taking of a three dimensional picture.

FIG. 3A is a top edge view of a film and lenticular screen assembly illustrating the incidence of various light rays thereon.

FIG. 3B is an optical diagram resembling that of FIG. 3 illustrating the taking of a picture.

FIGS. 3C, D and E are greatly enlarged diagrams showing the incidence of various rays on a moving lenticular screen. The film has been omitted in these views for clarity.

FIG. 4 is a schematic perspective diagram showing the projection printing process.

FIG. 4A is an optical diagram of the projection printing process showing the action of a single ray passing through the center of a curvature of a projection lenticular screen intercepting a traveling lens at three positions.

FIG. 4B is an optical diagram showing how the lenticular screen gathers light from a single point on the film for passing through a projection lens. The lenticular screen normally used in the projection process of the present invention is not shown in either FIGS. 4A or 4B for clarity.

FIG. 5 is an optical diagram showing the printing process illustrated in FIG. 3.

FIG. 5A is an enlarged fragment of the optical diagram of FIG. 5 with the projection lens 21 at the left of its travel.

FIG. 5B is a greatly enlarged fragmentary portion of the diagram of FIG. 5A.

FIGS. 5C and 5D are views like those of FIGS. 5A and 5B but with the projection lens 21 at the right hand of its travel.

FIG. 6 is an optical diagram showing the visual registration technique for registering a lenticular screen with a film containing stereo information.

FIG. 7 is a perspective illustrating a viewing of a stereoscopic picture.

FIG. 7A is an optical diagram provided for illustrating the principles of how a stereoscopic picture is formed.

FIG. 7B is an enlarged version of the optical diagram of FIG. 7A showing certain individual lenticulations of the screen.

FIG. 8 is a schematic diagram showing a conventional printing process using a fine, halftone screen for producing a plate negative that contains stereoscopic information.

FIG. 8A is a plan view of the negative produced by the conventional printing process of FIG. 8.

FIG. 9 is a perspective diagram illustrating the effect of a lenticulation on a bundle of light rays.

FIG. 10 is an enlarged optical diagram illustrating the effect of a 100 line halftone screen on light rays of various degrees of brilliancy.

FIG. 10A is a plan view of the image of the screen shown in FIG. 10.

FIG. 11 is a view like FIG. 10 showing the combination of the halftone screen and a lenticular screen.

FIG. 11A shows the image produced in FIG. 11.

FIG. 12 is an optical diagram showing the production of an isoflag from a film section that has a graded area of brightness.

FIG. 13 is a schematic diagram highly stylized showing how the isoflags may assume various shapes depending upon the objects depicted and their brilliance.

FIG. 14 is a highly enlarged presentation of the isoflags on a 100 line lenticular screen where the illumination was predominantly dim.

FIG. 14A is a view like 14 where the illumination was predominantly bright.

FIG. 15 is a fragmentary enlarged section showing film and screen holder of a projection camera embodying the invention.

FIG. 16 is a perspective diagram of a projection camera suitable for carrying out the process of the present invention.

FIG. 17 is an optical diagram showing the exposure of a pseudoscopic negative with an instantaneous camera.

FIG. 17A is an enlarged optical diagram at the camera negative.

FIG. 18 is an axillary compressed optical diagram like that of FIG. 17, showing additional principal rays.

FIG. 19 is an optical diagram like that of FIG. 17 showing an instantaneous projection printer.

FIG. 19A is an enlarged diagram similar to FIG. 17A showing the camera negative, the printing plate film and the halftone screen.

FIG. 20 is an enlarged, axially compressed optical diagram of the printing process shown in FIG. 19 showing additional principal rays.

FIG. 21 is a schematic diagram illustrating the viewing of a stereoscopic print made from the plate film of FIG. 19.

DETAILED DESCRIPTION

The detailed description of the invention which follows will begin with a description of a sequence of operations from the taking of the stereoscopic picture (the word stereoscopic to be hereinafter abbreviated as "stereo" for simplicity), to the viewing of a halftone reproduction of that picture.

The sequence to be described will be relative to a series of steps for making a stereo picture, which sequence represents only one of several techniques available for taking advantage of the printing plate film making process of the present invention. Except for an initial block diagram of a system embodying the invention, it will be found that the description initially runs through a series of operations necessary for the reproduction and viewing of stereo pictures as photographs, in order to establish certain principles relative to the phenomena of lenticular screens in stereo photographs. Knowledge of these phenomena is necessary for ready understanding of the invention in the halftone printing aspects of this invention.

Following the description of the principles of stereo lenticular screen photography is a description of the principles of a halftone reprodutcion process embodying the present invention, followed by a diagram of a scanning camera suitable for carrying out the invention.

The nature of the drawing in the discussion that follows is necessarily schematic and stylized. Also, because of the vast discrepancies in distances and dimensions involved, e.g., the camera to object distance as compared to the width of an individual lenticulation in the stereo screen, true scale cannot be maintained in the drawings if information as to the invention is to be visualized. It is also to be understood that as to the construction and optics of various cameras, printers and so forth that are necessarily involved in practicing the invention, no attempt is made to give working drawings or the like to these instruments. Once principles are known, the present invention can be translated by those skilled in the optical camera, and printing arts into commercially usable machines without employing anything more than the skill of the calling. Any special features of these optical instruments peculiar to the present invention will be presented to the extent necessary to enable one skilled in the art to construct an actual device. Were it not for this approach, the invention would be concealed by a large mass of material already in the prior art.

SYSTEM DIAGRAM

FIG. 1 is a block diagram of a system embodying the invention, the sequence of steps being conducted by dashed flow arrows. The first step is to take a stereo picture through a lenticular screen. In the system to be described in detail as illustrative, this involves the use of a scanning camera indicated generally at 10, and shown diagrammatically in FIG. 16. The camera has a small aperture lens 11 and incorporates a lenticular screen 12, which will be referred to as the taking screen. The taking screen abuts the camera film 14 and focused on the film is an intermediate object A, there also being a more remote object B and a near object C, the presence of which will be employed to illustrate the principles of the stereo photography involved.

In the example to be described in detail, the taking lenticular screen 12 will have 100 vertical lenticulations to the inch, which will be referred to for convenience, as a 100 line screen, each line, of course, referring to an individual lenticulation. Each lenticulation acts as a miniature cylindrical lens, and in the example being given the f/number of the lenticulations of the taking lenticular screen 12 will be given as f/4.

The taking camera film is developed to form a negative, also indicated as 14 and the next step is to register the negative 14 with a lenticular projection screen indicated at 12a. The manner in which this registration can be effected will be described briefly as the discussion proceeds. The lenticular screen 12a must have the same pitch as the taking screen 12, that is, it must be a 100 line screen, in the example being given. The f/number of the projection screen 12a need not be the same as that of the taking screen 12, but in the example it will be assumed that the projection screen 12a also has an f/number of f/4. The "registration" referred to is simply the positioning of the projection screen 12a on the stereo negative 14 so that the boundary lines between lenticulation images on the negative 14 coincide with the boundary planes between the lenticulations of the projection screen 12a.

After registration, the projection screen 12a is taped or otherwise fixed in position to the negative 14 and placed in a projection printer 20 in order to make an isoflag print through a halftone screen. The projection printing camera 20 has a lens 21 which projects images from the screen-negative assembly 12a, 14 through a halftone screen 16 and through a printing lenticular screen 12b onto the print film 14a. As will be described in detail presently, in the embodiment under illustration the printing camera 20 is a scanning camera, in that both the lens 21 and the screen-film assembly 16, 12b, 14a are moved synchronously during exposure. The printing screen 12b need not be of the same pitch as the projection screen 12a. For example, instead of being a 100 line screen, the screen 12b could be a 150 line screen. In the example being given, however, it will be assumed that the printing screen 12b is a 100 line screen and that its f/number is f/4. In the projection printer, an isoflag print is made which contains all the stereo information necessary for the production of a stereo printing press print that gives the same stereoscopic view as that given by a stereo photograph when viewed through a lenticular screen.

After completion of the projection printing operation, the print film 14a is developed and then used in accordance with conventional commercial printing practice in order to make a halftone printing plate. This printing plate includes the isoflags that contain all the stero information necessary to give the desired effect from the final print. The halftone plate 14b is then transferred to a printing press, illustrated in highly diagrammatic form at 22, and prints 18 are procduced. In order to view the prints 18 stereoscopically, it is first necessary to register each print with its individual viewing lenticular screen and bond the screen and print together. The viewing screen 12c must hve the same pitch as that of the printing screen 12b. However, the f/number of the lenticular viewing screen 12c can be different than that of the projection screen 12a. For example, if the printing screen 12b were a 150 line screen, then the lenticular viewing screen 12c would also be a 150 line screen, but in order to provide a wider viewing angle the f/number of the viewing screen 12c could be f/2. The smaller f/number also results in a lenticular screen which is thinner, an f/2 lenticular screen being only half as thick as an f/4 screen with the same number of lines per inch. A thin lenticular viewing screen is particularly desirable in case the stereo print is viewed in a book, magazine or the like, as illustrated in the last step of the diagram of FIG. 1.

As will be described in detail, even though the halftone screen 16 employed during the projection printing step need not be an unusually fine mesh screen, the formation of isoflags during the projection printing process insures that all of the necessary stereo information is present in the print 18 and hence, when the picture assemblage 18, 12c is viewed, a good quality stereo picture is presented.

PROPERTIES OF LENTICULAR SCREENS

FIGS. 2, 2A illustrate various properties of lenticular screens involved in the present invention. In addition, reference is hereby made to the patent to Winnek 2,562,-077, incorporated herein by reference, for further explanations of the technology involved in lenticular screen stereo photography. It is contemplated that these screens are made of a transparent, flexible plastic material having an index of a fraction $n$ in order of 1.5. Materials suitable for these screens are polyvinyl chloride, polyethylene, acrylics, and many others with suitable optical properties.

Fundamental formulae of these screens are given at the left of FIG. 2 and their derivation is familiar to those skilled in the art. The viewing angle "$a$" requires some explanation. Referring to the diagram of FIG. 2, which is a greatly enlarged fragmentary section of a lenticular screen 12 viewed from its top edge, the screen can be considered to be formed of a series of cylindrical lenses, having a cylindrical outer surface 26 and a planar inner or back surface 28. The dotted lines 30, indicate hypothetical boundaries between each of the lenticulations. The radius of curvature R and the index of refraction $n$ are selected so that the focal plane of each lenticulation for parallel light rays is at the rear surface 28 of the screen. The viewing angle "$a$" is bounded by the extreme rays passing through the center of the radius of curvature R of the screen and terminating at the junction of the lenticular edges 30 and the rear of the screen 28 as shown. These rays are normal to the surface 26 and hence are not refracted. Each cylindrical lens or lenticulation provides a unique picture element containing a continuum of stereo information images across the rear face 28 thereof, and the viewing angle $a$ within which the information behind each lenticulation can be seen is defined by the extreme rays passing through the center 27 of the radius R and extending to each of the "corners" of each lenticulation, these corners being the intersection of the hypothetical boundary planes 30 and the rear face 28 of the screen.

FIG. 2A is a diagram of two lenticulations, various surfaces thereof being drawn relatively to scale. The purpose of this diagram is to indicate the physical dimensions of the lenticulations in relation to their f/numbers, and also indicate the corresponding viewing angles $a$. The index of refraction is assumed to be equal to 1.5, and it is believed that diagram 2A is self-explanatory.

FIG. 2B illustrates certain properties of the lenticular screen with the lenticulations thereof acting as lenses. At the left of FIG. 2B, parallel bundles of rays G and H are seen entering adjacent lenticulations at divergent angles. In this, and in other views the mythical boundary planes 30 between lenticulations is drawn in solid lines for simplicity of illustration, it being understood that the screen is actually one solid sheet of transparent material. All of the parallel rays of bundles G that are encompassed by one lenticulations will come to focus at a point G' behind that lenticulation (neglecting aberrations). The point G' also intercepts a ray passing through the center of curvature 27, shown in dashed lines. The bundle of rays G is also shown as including a ray G1 which strikes an adjacent lenticulation. This ray will be refracted and strike a base of the screen 28 at a point G1' behind that lenticulation. The points G' both occupy the same relative positions on the lenticulation bases 28. Similar considerations can be applied to the bundle of rays H striking the screen at a different angle of incidence.

At the right of FIG. 2B, a series of divergent rays is shown, all passing through the center 27 of the radius of curvature R of the screen. The series of rays J includes a number of rays which lie within the viewing angle $a$ of FIG. 2. These rays are all unrefracted, and all but one falls within the width $w$ of the base of the lenticulation at the base 28. One of these rays J1 diverges from a normal ray through center 27 by an angle greater than half the viewing angle $a$ (which is assumed to be 28° in this example), and hence passes right through the lenticulation just referred to and terminates at the base of an adjacent lenticulation at point J1'. Thus, the point J1' would be viewed only along the line J1, or along a nearby parallel line emerging from the same lenticulation, or at a different angle through an adjacent lenticulation as shown by J1''. Thus, although light passes through the outer surface 26 of one lenticulation, the image is sometimes at the base of another. The lenticular screen illustrated in FIG. 2B in an $f/2$ screen.

The point to be made relative to the present invention in FIG. 2B is that as indicated in the left-hand figure, if one were looking into a screen at a given angularity, i.e. with one eye as long as that angularity is maintained within the width of a lenticulation, the viewer will always see one uniquely positioned point in back of a given tions exist whether light is incident upon or emanating lenticulation. Conversely, if one were to look through the screen at varying degrees of angularity, the back of the screen would be scanned. Of course, similar conditions from the back of the screen.

TAKING A STEREO PICTURE

FIGS. 3 to 3E illustrate the principle of one mode of taking a stereo picture. In the technique to be described, the picture is taken with a scanning camera having a relatively small aperture lens (about $f/50$) although generally speaking, the nature of the taking camera is not critical to the present invention. For example, a wide lens camera such as that disclosed in the aforesaid Winnek Pat. No. 2,562,077 could also be employed for taking the picture and making the stereo print 14a as described later.

The principle of producing a stereo picture can be summarized by stating that a picture is taken so that the images of the object field from the different viewing angles are recorded at unique positions on the film in back of the lenticulations resulting in a continuum of pictures and the viewer of the final picture in turn sees only two of these different pictures at any time with the particular pair of pictures seen varying as the viewer moves his head back and forth laterally relative to the picture. One of the principal purposes of this invention is to retain as much as possible of this discrete information, in the printing press reproduction of stereo pictures.

Referring to FIGS. 3 and 3A, the lenticulations of the taking lenticular screen 12 have been arbitrarily numbered in accordance with a system wherein the center lenticulation is #0, and when looking down on the screen the lenticulations are assigned positive numbers counting to the left and negative numbers counting to the right. Thus, with a 100 line screen, a lenticulation #+116 would be 1.16 inches to the left of the center (lenticulation #0) and lenticulation #−175 would be 1.75 inches to the right of the center of the screen.

In FIG. 3, a convention is adopted wherein three objects A, B and C are exposed along the principal or central axis of the picture plane. It will be assumed that object A will be the point of interest and that the camera is focused on object A. Stated differently, if a viewer focused on A and moved his head from side to side, his views of objects B and C would move relative to A, and in opposite directions. Lines emanating from these objects at various angles of incidence from the central picture axis are indicated as (A), (B), and (C), and these lines are shown at several positions of the camera lens and film.

The convention is further adopted that the images of the incident light rays of the various objects (in or out of focus), are given circled numbers. Each of these image points is unique, representing the image of an object at one and only one position of the screen and film assembly and of the lens. During exposure of the picture with the taking camera 10, both the lens 11 and the film and screen assembly 12 and 14 are moved laterally at linear rates which bear a constant ratio to each other (see the notations on FIG. 3B). As the picture is taken, the images from a given object not in the plane of principal focus are successively formed on adjacent lenticulations from one side of the screen to the center of the screen and then onto the other side of the screen. The lenticulations, functioning as indicated in FIG. 2B, render the images behind each lenticulation unique, and generally non-superimposed.

FIG. 3A is a diagram of the film and screen assembly 12, 14 drawn on a larger scale, showing all of the images 1 to 7 produced by the scanning camera and indicating the objects from which these images emanate.

FIG. 3B is an optical diagram showing the information illustrated in perspective in FIG. 3 and also giving distances involved relative to the objects, the scanning camera lens and screen travel. These distances are given merely by way of example and given for purposes of explanation. The distances of lens and screen travel depend upon the distance from the lens to the principal (focused) object A, as well as the distance between the screen and the lens and the $f/$number of the screen. As will be seen (FIG. 16) assuming a distance to the principal object A, and a lens spacing from the screen, film combination 12, 14 a camera can be made to scan the view by employing a simple rack and pinion assembly. In this and in other views, the lens is shown as a simple double convex lens. If more complex lenses were used, the optical center of the lens assembly would form the reference plane for distance measurements.

Optically, when the film and screen are at the left or point X in FIG. 3B, the rays (C) from the near object C are directed by a lenticulation to the film at a point 1 which is in the left half of the film; the ray (A) from the principal object A will be focused on the film at point 2, which is under lenticulation #0 at the optical center of the film; and the ray (B) from the remote object B will be imaged at point 3 on the right half of the film. At the Y position of the screen and film which is along the normal or picture axis, the rays (A, B, C) from all three objects A, B and C (if nearer objects do not eclipse those behind them), will be imaged by the center lenticulation #0 on the same spot, point 4. At the right hand position Z of the film, conditions will be symmetrically reversed from those of position X, in that points 5, 6 and 7 represent the images of rays from objects B, A and C, respectively, and positionally complementary to points 3, 2 and 1, respectively.

In order to understand the significance of the optical diagrams of FIGS. 3 and 3B a series of enlarged explanatory views of the screen is presented in FIGS. 3C, D and E. In these figures, the film has been omitted for clarity and only lenticulations under discussion are shown. The size of the lenticulations has been exaggerated in these figures for purposes of illustration. Referring to FIG. 3C it can be seen how the ray (C) images at point 1 passing through lenticulation #+174 and continuing on into the base portion of lenticulation #+175. The principal ray only is shown here, that is the ray that passes through the center of curvature of the surface 26 of the lenticulation. This is true in the other illustrations in these figures, but the aperture of the camera lens 11 is so small, that other rays from a given object come in almost parallel and image at the same point, as seen at the left of FIG. 2B. It will be noted that the image represented by point 1 is near the right hand edge of lenticulation #+175.

The rays (A) will be focused by lenticulation #0 at point 2 at the left hand edge of the base of that lenticulation. The rays (B) will be focused by lenticulation #−116 at a point 3 near the left hand edge of the base of that lenticulation.

FIG. 3D merely illustrates what has been mentioned previously, namely when the screen 12 is on the normal or picture axis, the rays (A), (B) and (C) image at the center of lenticulation #0 at point 4. This figure also illustrates the position of image 2 of object A that was formed when the screen was at the left-hand position X during exposure.

FIG. 3E is a third enlarged diagram showing the screen at position Z and now it can be seen in more detail how the rays (B), (A) and (C) are imaged at points 5, 6 and 7, respectively. FIG. 3E likewise indicates, for purposes of orientation, the positions of the images 1 to 4 formed on the film at the previous positions X and Y, as previously described.

It can be seen from the examination of FIG. 3 that at a given film and lens position, a nearer object such as C will always have an incident angle in one lenticulation greater than that of an object such as B further from the camera, and that the images occur behind different lenticulations.

PROJECTION PRINTING

In accordance with the plan of this explanation the projection printing process illustrated in perspective in FIG. 4 will first be explained in connection with a process wherein isoflags are not formed, that is, when the halftone screen 16 (FIG. 1) is omitted from its position at the printing screen and the print film. Production of isoflags by the halftone screen will then be explained.

The printer 20 includes a scanning camera which operates in accordance with the same general principles as the scanning picture taking camera 10, and a simplified perspective diagram of the printer appears in FIG. 16. The same principles of construction can be used in designing the picture taking scanning camera 10.

As previously described in connection with the block diagram of FIG. 1, before projection printing under the present invention a projection screen 12a, which must be of the same pitch as the taking screen 12 (a 100 line screen in the example being described), is registered with the developed negative 14 made by the taking camera. This assembly is illuminated by conventional means shown schematically in the form of a lamp 34 and a light diffusing plate 36, FIG. 4. The printer lens 21 which scans the taking camera negative 14 and its lenticular screen 12a is another small aperture lens (e.g. about f/50) and is moved at a predetermined rate selected in accordance with the physical distances involved between the two films and the lens, the lens aperture, sensitivity of film 14a, etc. to provide the desired exposure for printing behind each lenticulation of the printing screen 12b. As mentioned, the pitch of the printing screen 12b need not be the same as that of the projection screen 12a because a new picture of the taking camera negative 14 is now being made. However, for simplicity of illustration, it will be assumed that the printing screen 12b is also a 100 line screen. In the projection printing operation the scanning process is such that the small aperture lens 21 successively scans images behind each lenticulation of the projection lenticular screen 12a and focuses these images on the lenticular printing screen 12b. The latter duplicates the array of images behind each lenticulation of the negative 14 on the print film 14a, thereby making a true or orthoscopic stereo print.

FIGS. 4A and 4B illustrate some of the principles of the scanning type projection printing described, these views omitting the lenticular printing screen 12b for purposes of initial explanation. FIG. 4A shows how principal rays passing through the center of curvature of a given lenticulation but emerging from the taking camera negative 14 at different angles relative to the picture axis will strike the plane of the print film 14a at different positions along the lateral extent of this plane. It will be noted that these principal rays cross at the center of curvature of the lenticulation illustrated, so that the order or sequence of both sets of images, as viewed from in front 14 or 14a is unchanged. Thus if the film 14 is orthoscopic, the film 14a will be also, insofar as the relative positions of the images is concerned.

FIG. 4B illustrates the principle previously mentioned in connection with the left-hand diagram of FIG. 2B. Assume a given angularity of the principal ray passing through the center of curvature 27 of a lenticulation in the projection screen 12a. Light from a point image on the camera negative 14 from which said ray emanates will be collected by the overlying lenticulation and projected as a bundle of parallel rays. This bundle of rays will, in turn, be focused by the printing lens 21 onto the print film 14a, as an image of the original point being described. The aperture of the lens 21 is so small (e.g. f/50) that the convergence of the rays leaving the lens 21 is insignificant (e.g. about 1 minute of arc total angle) so that the action of the printer can be explained on the assumption that these rays are actually parallel.

FIG. 5 is an optical diagram corresponding to the perspective of FIG. 4 illustrating the geometry of making the projection print. In the example given the distances between the projection screen 12a and the scanning lens 21 and the printing screen 12b and that lens are assumed to equal 27.7 inches. The convention, relative to numbering of point images previously adopted, is repeated in FIG. 5 and succeeding pictures except that the image of point 1, for example, on the taking camera film is given the number 1a on the projection film. FIG. 5A presents a portion of the optical diagram of FIG. 5 drawn to slightly larger scale and is self-explanatory. Only principal rays appear in FIG. 5A, but, as mentioned the lens 21 has a small aperture and hence other rays making up the images 1a, 2a, etc., can be assumed to enter the lenticulations of the projection screen 12b as parallel rays.

FIG. 5B is a greatly enlarged, non scaled diagram showing the phenomena illustrated in FIG. 5A. The image 1 from object C is projected by the lens 21 onto lenticulation #+174a and is focused at the base of #+175a as an image 1a. The image point 2 from the picture plane object A is also aligned with center of curvature 27 of its lenticulation #0 and the center of the lens 21, and hence appears as an image 2a at the left edge of lenticulation #0a of the projection printing screen. The same conditions relative to the camera negative image 3 and its print 3a for the remote object B, likewise obtain.

As indicated at the projection screen portion of FIG. 5B, light rays will also be projected from points 7, 6, 4 and 5 in the direction from which these images were made in the taking camera 10 as well as in other directions (not illustrated). However, in projection, these latter rays miss the aperture of the projection lens 21 and do not reach the printing screen and film. The conditions are just as if the images 7, 6, 4 and 5 were not present in the particular film and printing screen position of FIG. 5B.

FIGS. 5C and 5D correspond to FIGS. 5A and 5B just described, but with the printer elements disposed at the righthand position of their scanning motion. As seen in these figures the taking camera negative points 7, 6 and 5 are those which are aligned with centers of curvature 27 of lenticulations in the screen 12a and with the optical center of the projection lens 21. Hence these points form images 7a, 6a and 5a, respectively, on the print film 14a. The other images on the taking camera negative 14 are not "seen" by the projection lens 21 in a manner which will form images on the print film 14a. As the result of the projection printing process just described, a true or orthoscopic stereoscopic positive print 14a is formed, which is a geometric and optical duplicate of the taking camera negative 14 shown in FIG. 3A, except that the film 14a is a positive instead of a negative and, hence, would be suitable for stereoscopic viewing. Although described for a 1 to 1 size ratio and for a 100 line per inch printing screen, the normal range of enlargements and reductions can be made and printing screens with other numbers of lines per inch can be used.

VISUAL REGISTRATION TECHNIQUE

FIG. 6 illustrates a visual registration technique for insuring that the required registration between a lenticular screen and either a film being projection printed or a print being viewed is provided. In FIG. 6 the registration technique is illustrated relative to the taking camera film 14 and the projection screen 12a. As previously explained, principal rays passing through the center of curvature 27 of each lenticulation will pass through the lenticular screen unchanged, that is, without refraction because the angle of incidence with the curved face 26 of the lenticulation is zero degrees. Points $p$ and $q$ have been selected at the base of the screen 12a as reference points and these points are assumed to be at the geometrical margins (planes 30) of the lenticulation being considered. If the viewer changes his angle of view over an angle $pq$ but still looks (preferably with one eye) through the center of curvature 27 of the lenticulation, the viewer will see corresponding points $p$ and $q$ at the base of the lenticulation and all points therebetween, due to the cylindrical lens action of the lenticulation, previously described. Of course, the points $p$ and $q$ and all those therebetween represent actual images taken by the taking camera 10 (or projected by the printer 20) and can all be considered to represent viewing the same "picture" from a slightly different angle, within the range of the viewing angle "a" (FIG. 2). In fact, it is this property which in the final screen assembly gives one of the stereoscopic effects.

If the picture is tilted on a vertical axis, or the viewer moves his head through the angle represented by the various views between $p$ and $q$, objects in the background will appear to move relative to the picture plane object in one direction, and those in the foreground appear to move relative to the picture plane object in the opposite direction. If the angle of viewing exceeds that between $p$ and $q$ (the viewing angle) the principal rays pass through the central lenticulation and onto the base of an adjacent lenticulation. For example, if the viewer moves his head from point $q$ to point $p'$ he now sees an image $p'$ at the base of an adjacent lenticulation, which point has the same relative position in that lenticulation that the point $p$ had in the central lenticulation. The same remarks apply to the viewing picture through the angle $p''$ and $q''$. This changing picture seen from $p$ to $q$, in effect, repeats itself from $p'$ to $q'$ and from $p''$ to $q''$. As the viewer's line of sight passes from point $q$ to point $p'$ the boundary plane 30 between adjacent lenticulations is passed by the line of sight and the picture "flips." As mentioned, the new picture seen from $p'$ would look essentially the same as the one originally seen from $p$. The same remarks apply to viewing the picture to the angles between the points $q''$ and $p''$.

Now to use this phenomenon in a visual registration technique, the viewer first places the lenticular screen on a stereo film and orients the vertical axes of the lenticulations with the axes of the lenticularly produced images embodied in the film. This vertical orientation is most easily performed by observing moire effects in the form of dark and light bands that will appear in the picture when the axes are not lined up. These bands become more widely spaced and more nearly vertical as the axes become more nearly aligned. When they are properly aligned the bands will be vertical and at their maximum spacing, or disappear from the picture completely. After the vertical registration is thus produced so that moire patterns are minimized, the next step is to align the screen and the film so that the hypothetical boundary planes 30 of the screen lenticulations coincide with those that were in front of the film when the picture was taken or when it was projection printed.

This is accomplished by shifting the screen and film relatively to one another until the best picture appears, preferably when the viewer is looking substantially perpendicularly to the film. Attainment of registration requires some judgment, but is easily accomplished with a little practice.

STEREOSCOPIC VIEWING

FIGS. 7, 7A and 7B illustrate the principles of how the stereoscopic print 14a prepared in accordance with the techniques just described can be viewed stereoscopically, a lenticular viewing screen 12c must be placed in front of, registered with, and secured to the projection print 14a.

In FIG. 7 the numbering system of the image points and lenticulations previously employed is continued for consistency and clarity of explanation. The lenticulation numbers of the viewing screen 12c have been given the subscript $a$, and correspond numerically to those of the printing screen 12b. The viewing screen 12c must have the same pitch as that of the printing screen 12b from which the print 14a was made, but the $f$/numbers of these screens need not be the same. For example, if it is desired to provide a wider viewing angle "a" than that provided by the printing screen, the viewing screen (assumed here to have an $f$/number of $f/4$) could be provided with a lower $f$/number, namely, $f/2$. This will reduce the number of flips or new pictures seen by the observer, should he change his angle of view, but will also reduce the stereoscopic effect somewhat.

FIG. 7A is an optical diagram of the effects obtained when viewing the picture as illustrated in FIG. 7. Because of the "optical capturing action" of the lenticulations of the viewing screen 12c, only rays emanating from the various points of 1a to 7a of the print 14a at their printing angles can be seen. These points are for purposes of explanation since the exact points seen will vary with the viewers interocular spacing and the viewing distance. The viewing screen forces the eyes of the observer to view various objects depicted in the print 14a long angles which are relatively the same as those subtended when the original picture was taken (FIG. 3). The stereoscopic effect of the picture is assumed to be due to physiological phenomena wherein the brain interprets the angles of the rays entering the two eyes into relative distances of the objects from which they emanate. The print and screen combination present photographic or printed images of these objects at angles which duplicate the physiological effect that would be obtained if the object were real and viewed approximately at their original relative distances.

As illustrated in the optical diagram of FIG. 7A, the days from images A' of the focal object, which emanate from image points 2A, 4A and 6A, are in the picture plane, so that when the viewer's eyes focus on these images, a reference plane is established subconsciously. The image of the nearer object C originates from the points 7a and 1a and these rays cross at a point C' in front of A', and appear to emanate from C', and hence give the impression that the original object C (FIG. 3) is nearer to the observer than the original object A. Similar phenomena occur relative to the original more distant object B, which now appears to the viewer as an object B' engendered by the images 3a and 5a. The lines from the observer's eyes through the points 3a and 5a appear to intersect at a point B' behind the picture plane, and appear to emanate from this point, so that the brain interprets this smaller angle of binocular vision as representing a more distant object.

FIG. 7B is an enlarged, highly diagrammatic view further illustrating the principles of picture depth illusion described in connection with FIG. 7A. The figure is a companion to FIGS. 5B and 5D as to mode of presentation. It will be remembered that the images 1a to 7a appearing on the viewing print 14a are "optically captured" by the presence of the lenticular viewing screen 12c in front of the print. For an example, the image 7a will be seen by the right eye of the viewer along the line (C) as will other rays indicated in dashed lines, which are essentially parallel to the principal ray (FIG. 2B). It will be noted that this also represents a light gathering action by the lenticulation #—174a, so that the image of 7a is bright. Similarly, the image 1a will be seen only when the viewer's left eye is directed along the other line (C), and since these lines of vision cross at C', an impression of nearness is effected. When the viewer focuses his eyes on the picture plane and directs them so that the *fovea centralis* receives rays from images 2a and 6a from the lenticulation number #0a, an image A' of the object A in the picture plane is perceived. Thus, as previously explained, the viewer's brain interprets the angles of the bundles of rays as representing conditions of actual observing the objects depicted in the photograph. Thus, the convergent points A', B' and C' previously mentioned in connection with FIG. 7A will give the impression of depth to the picture, and in fact, if the picture is tilted about a vertical axis within the viewing angle of the lenticulations, although the same general picture will be presented to the observer, as described in connection with the registration technique, distant points will move in one direction and near points in the other, relative to objects in the picture plane. If the observer turns the picture or looks at the picture at a new angle normal to the picture plane that exceeds half the viewing angle, the picture will "flip," and a new picture will appear as previously explained.

PRODUCTION OF ISOFLAGS

As indicated earlier in the specification, the principles of lenticular screen stereo photography have been outlined in order that the printing of stereoscopic pictures, of this type involving the production of what are termed "isoflags" under the present invention, can best be understood.

A significant advance in the art represented by the present invention is that not only is it possible to make a halftone plate that includes more stereo information than prior halftone plates for stereo picture printing, but the halftone screen employed in connection with the present invention can be considerably coarser than that previously believed necessary for this class of printing. It is well known that very fine halftone screens present serious problems to the printer in etching and printing the resultant plates but heretofore, where the conventional grid or crossed line type halftone screens were used to make stereo plates, even the finest screens did not result in plates that contained very much stereo information.

For example, FIGS. 8 and 8A are presented as illustrative of prior stereo processes using a 300 line halftone screen. Here, a conventional printer 37 is employed, and a taking camera negative 14 (which could be a stereo negative such as a negative 14 produced under the present invention) is illuminated by an illlumination source 38 of conventional design. A fixed lens 39 projects the image of negative 14 onto a sensitized film or plate 18a for making the printing positive. No lenticular screen is used, either at the taking camera negative 14 or at the plate 18a, but for purposes of comparison of this prior technique with the process of the present invention, and to provide scale, the margins 30 of a 100 line lenticular screen are indicated in broken lines at the plate 18a. As illustrated in FIG. 8, a 300 line halftone screen 16a (which is commonly required in the processes) is mounted in front of the plate 18a. As seen in FIG. 8A the halftone screen 16a produces a series of dots on the plate 18a, the dimensions of which correspond to the intensity and duration of the light projected onto the plate 18a through the halftone screen. It can be seen that only about three of these dots 18b could have been encompassed within the width of a single lenticulation of a 100 line lenticular screen, such as the exemplary screen described and used in accordance with the present invention. Thus, even though an undesirably fine halftone screen is employed in this process, only approximately three bits of stereo information are present in back of each lenticulation in each horizontal row of dots. Although the halftone screen is shown to be square with the lenticulations for clarity, it is normally used at some angle to avoid moire' patterns. This also increases the stereo information slightly.

FIGS. 9 to 11A illustrate significant principles involved in the production of the isoflags of the present invention, which isoflags contain a relatively unlimited number of bits of stereo information across the width of each lenticulation. FIG. 9 shows how a single lenticulation of a lenticular screen 12 converts a bundle of parallel light rays in a cylindrical envelope striking the convex surface 26 of the lenticulation into an image which is a straight line parallel to the lenticulation axis, this being a cylindrical lents phenomenon.

FIGS. 10 and 10A show how a 100 line half-tone screen (although the number of lines is immaterial insofar as the principle is concerned) converts envelopes of dim, neutral and bright light into dots, and how these dots increase in diameter as the brightness or duration of the light increases. This is the well known but difficult to explain phenomenon of halftone screens and it is this phenomenon which makes a printing plate formed with a halftone screen give tonal gradations when the print from the plate is viewed with the naked eye.

FIGS. 11 and 11A show how the same dim, neutral and bright bundle of rays illustrated schematically in FIG. 10, when projected through a 100 line halftone screen 16, produce lines of varying length when a lenticular screen 12b is interposed behind the halftone screen. It will be noted that the image lines on the plate 14a produced by the dim bundle of rays are the shortest and those produced by the bright bundle of rays are the longest. Thus the brightness of images passing through the halftone screen 16 is recorded in terms of the lengths of thin vertical lines, the width of each image line being very small, and determined by the nature of the emulsion on the plate 14a and the optical quality of the lenticular screen 12b.

FIG. 12 illustrates the production of the stereo information bearing isoflags of the present invention. The taking camera negative 14 is shown edgewise with the lenticular projection screen 12a interposed in front of the negative. This is in contrast with the prior process shown in FIG. 8, wherein no lenticular screen is provided at the camera negative. Directly above the film-screen is shown a fragmentary plan representation, in stylized form, of the density of various zones of the negative 14 across a single lenticulation. Dots are arrayed on this plan view in order to illustrate that in the particular lenticulation under consideration the negative density is such that the light transmitted through the negative 14 varies from a maximum at the left (least dense zone) which is labeled "dim," through "neutral," to "bright" at the right (almost transparent zone). The terms "dim, neutral and bright" do not refer to the negative density, but to the relative brightness of the original objects from which the negative was made.

In making the halftone plate 14a under the present invention, and as previously explained in connection with making a simple photographic projection print, the lens 21 of the printer 20 is a small aperture lens that scans the film being printed through the lenticular screen 12a and from varying angles. Also, and as previously explained, lenticular printing screen 12b is interposed in front of the sensitized plate 14a. In order to produce the isoflags of the present invention, a halftone grid 16, referred to initially in this specification, is interposed in front of a lenticular printing screen 12b which is not used in prior art processes. In the process being illustrated, the halftone screen 16 is relatively coarse, compared to that required by prior art process. Thus, in FIG. 12, a 100 line halftone screen or grid (which is easily handled by current printing techniques) is illustrated for use in the invention.

The sensitive plate 14a and the associated lenticular printing screen 12b and halftone screen 16 are moved in synchronism with, but at a faster rate than the lens 21, in accordance with the projection printing principles previously described. The result of this process appears as shown in the series of diagrammatic plan views of the exposed plate 14a, appearing at the bottom of FIG. 12. As the lens, the screens 16 and 12b and the plate 14a are moved to the right (as in FIG. 3B), the "bright" area of the taking camera negative 14 (which is actually the denser portion of the negative) first appears as a short narrow, vertical line at the margin of one of the lenticulations. The principles of the vertical line image have previously been described in connection with FIGS. 11, 11A and the scanning principles of the projection printer have been described in connection with various FIGS. 5. The denser the negative (corresponding to bright objects) the less the light transmitted from the illumination source, and hence the shorter the isoflag at the plate 14a. This gives the impression of "bright" when viewing the plate 14a, because a minimum of the plate emulsion is darkened by the light.

As the scanning and exposure continues, light from a "neutral" density portion of the negative 14 gathered by the lenticule of screen 12a and collimated to pass through the lens 21 onto the midportion of the film 14a which is under the same lenticle of the lenticular screen 12b, thus producing a longer line image on the screen. As seen at the bottom of FIG. 12 with the density of film 14 being described by way of example, the presence of the halftone and lenticular screens at the plate 14a and the lenticular screen at the film 14 results in a triangular image on the sensitive plate 14a. This production of light spots which vary in size in accordance with their intensity, and conversion of these spots into lines on the plate of corresponding length continues until the "dim" zone of the film 14 is focused by the lens 21 onto the plate 14a, the bright zones forming the longest images in the isoflags. The triangular image 40 is completed, as illustrated at the bottom of FIG. 12. This image 40 is an isoflag of the various images on the camera film 14 and contains a continuous spectrum of stereo information across the entire width of the associated lenticulation. Isoflags of various images on the camera film are produced behind all of the lenticulations.

Of course, the isoflags will not be normally geometrical shapes as shown in FIG. 12. They will have a multitude of shapes depending upon the illumination and physical disposition of the objects photographed. Also, the presence of bright objects behind dark objects, etc., coming into view or being eclipsed as the scanning proceeds will make isoflags of a variety of patterns. Stylized varieties of isoflag patterns are illustrated on a plate 14a at 40a, 40b, etc. in FIG. 13.

All of the detail of the original picture but in a halftone screen type array of isoflags, is present in a plate 14a made in the printer 20 under the present invention. The isoflags present this stereo information in the form of generally discrete exposed areas on the plate 14a so that the conventional plate making and printing process can be carried out. FIGS. 14 and 14A are highly enlarged representations of actual isoflags representing dim and bright areas of a picture, and the generally continuous nature of the isoflags within the dimensions of a lenticulation, as compared to the individual dots of prior processes (FIG. 8A), is apparent from these figures. The vertical lines in FIGS. 14 and 14A are images formed at the geometric boundaries between lenticulations. When viewing the printed picture, one does not see these groups of light lines, except as the picture "flips" from one viewing zone to another.

FIG. 12 merely illustrates how the vertical height of the isoflags at each point is proportional to the brightness of the scene at that point, directly or indirectly depending upon whether we are dealing with a positive or a negative. As has been explained, these various isoflag heights are actually viewed so as to present stereo information (FIG. 7B) and the isoflags align with the lenticulations of the viewing screen 12c, this alignment being most precise at the central group of lenticulations. As a result of the picture taking technique described (e.g. FIG. 3), and the printing through lenticular screens 12a and 12b with the screen 12b behind the halftone screen (FIGS. 12 and 15), when the picture is viewed through the viewing screen 12c, the left part of each isoflag carries the picture information for the right eye and vice versa. This is an important characteristic of the present invention and represents an improvement over the manner in which stereo information is presented by mere halftone dots printed directly (FIGS. 10 and 10A) on the base, without benefit of a lenticular screen during printing.

A SCANNING CAMERA

In the process of the present invention previously described, a scanning camera 10 and a scanning printer 20 were employed in order to provide a camera negative which gives views from various angles and in order to provide a stereo projection print. The particular lenticulations used at both the film and print are not critical to the present invention except as previously pointed out, so long as the required motions of the lens and the film holder are provided. FIG. 15 is a diagrammatic illustration of the mounting of the halftone screen 16 in front of the lenticular printing screen 12b and the film 14a. The film carrier indicated at generally 41 includes a frame 42 mounting a ground glass focusing screen 43. The film 14a for forming the plate and the lenticular screen 12b are held against the ground glass 43 by a frame 44 which mounts the halftone screen 16. Clips 46 hold the parts resiliently together. The distance of the halftone screen 16 from the lenticular screen 12b is determined by the nature of the screen and is not critical. It has been found that distances in the order of $\frac{1}{64}''$ to $\frac{1}{8}''$ are suitable with a normal 100 line glass halftone screen and with a lenticular screen 12b having 100 lines to the inch and an F/number of F/4. A so-called contact screen would be at a closer spacing or in actual contact. Of course, it is understood that these are mere examples.

FIG. 16 is a simplified diagram of the scanning printer camera 20, and the principles of this construction can be employed on the scanning taking camera 10. The print holder 41 shown in FIG. 15 is slidably mounted on rods 50 supported in the camera frame (not shown). These rods have mountings 51 in the camera frame (not shown). These mountings may include control microswitches for stopping the drive motor and terminating the exposure by the camera shutter (not shown) but these are design refinements not critical to the invention. The print holder is adjustably mounted on a rack 52 by clamp screws 54 or the like extending through slotted ears on the print holder. This construction permits racks 52 of various vertical dimensions to be fitted to the print holder. The lens board 56 for the lens 21 slides rods 50a and is supported on a rack 52a by a similar vertical adjustment 54a. The lens 21 is assembled with a shutter and diaphram stop (not shown). The lens 21 and the print holder 41 are simultaneously moved in accordance with the principles previously discussed in order to view the negative on an illuminated negative holder 58 from various angles through its superposed lenticular screen and to successively expose the print film in the print holder 41 behind the halftone screen and the lenticular screen (FIG. 12).

The construction and illumination of the negative holder 58 are conventional. In order to cause the lens 21 and print holder 41 to scan at the proper velocity ratio to simultaneously produce the desired travel, these elements are simultaneously driven by a gear motor 60, the speed of which is to be controlled by any conventional means, not shown, to regulate the exposure. The shaft 62 of the gear motor mounts a 72 tooth gear 64 for driving the rack 52 of the print holder 41 and a 36 tooth gear 66 for driving the rack 52a of the lens 21. These ratios have been selected merely by way of example and are the proper ratios (same pitch gears) for the dimensions of the printer and the spacings of the negative from the lens 21 illustrated in FIG. 5. If the distances between the lens 21 and the print holder 40 is changed, the number of teeth on the lens board driving gear 66 is changed accordingly. This normally would require adjusting the vertical position of the rack 52a to maintain mesh of the teeth without disturbing the optical axis alignment of the lens. Also, the print holder rack 52 can be adjusted and its drive pinion 64 replaced if it is desired to vary the sweep of the print holder.

The scanning camera 10 can be of a construction similar to that of the printer 20 shown schematically in FIG. 16. For a picture set-up like that of FIG. 3B, the gear 64 for driving the print holder can also be a 72 tooth gear, but this holder is now used as a holder for the taking lenticular screen 12 and the camera film 14. The gear 66 for driving the lens board 56 for the camera lens 11 would be a 52 tooth gear for producing the scanning effect of FIGS. 3 and 3B. Of course, the object A focused upon would be in the position of the print holder 58.

MOIRE' PATTERN ELIMINATION

In cases where the use of the two lenticular screens required in the printing step (FIGS. 4 and 12) produces moire patterns to an unacceptable etxent, the two lenticular screens 12a and 12b may be relatively inclined by an angle of about 15°, thereby improving picture quality. Preferably the screen 12b will be vertically disposed. Details of this technique, which may be employed in the printing process of the present invention, are explained in the aforesaid application of Winnek, Ser. No. 525,572, filed Feb. 7, 1966, now Pat. No. 3,409,351, granted Nov. 5, 1968, for composite stereography.

USE OF AN INSTANTANEOUS CAMERA

Stereoscopic pictures and prints which give the effect of those previously described can also be made with instantaneous wide lens camera equipment. The camera and printer previously described employ mechanical scanning during taking of the picture and during projection printing. It is possible to accomplish comparable results by using what will be termed "optical scanning" both at the camera and at the projection printer. As explained in the aforesaid Winnek Pat. No. 2,562,077, the use of the wide lens camera for taking stereo pictures is known in the art, but this camera has two characteristics not present in the mechnical scanning camera previously described. One of these characteristics is that an instantaneous wide lens camera produces a pseudoscopic negative, that is, a negative wherein objects remote from the picture plane appear to be nearer than the picture plane and vice versa. The other characteristic is that the camera must have a "wide lens," that is, a lens whose horizontal dimension is in the order of ocular separation (interpupilary distance) of the eyes and preferably larger than that seperation. Such lenses are expensive to manufacture.

In the optical diagram of FIG. 17, a taking camera 10a having a wide lens 11a is shown. This lens has a 6.92 inch horizontal aperture and a small vertical aperture (about ¼ inch). The lens illustrated has a 20 inch focal length and hence, has an $f$/number (horizontal) of $f/3.46$. The camera film is assumed in this example to be 27.7 inches behind the lens. The object A in the picture plane on which the camera lens is focused is 72 inches from the lens and a remote object B 36 inches behind A is illustrated. A near object C (36" in front of the picture plane) is also shown. For simplicity of illustration, in FIG. 7 and FIG. 17A only boundary rays from the remote object B are illustrated.

It will be assumed that the lenticular screen 12d in front of the camera film 14c, has 100 lines per inch and an $f$/number of $f/4$. Under these conditions, and with a 20" focal length lens, rays (B) from object B will be focused by the lens at a point B" which is 3.15 inches from the film 14c. These rays will produce images 3 and 5 on the film. These images will be separated by a distance of about 0.889 inch which means that each of these points is approximately 0.445 inch from the optical axis of the camera. In order to provide right and left orientation of the scene, a small arrow is shown behind object B and in accordance with known principles this orientation is maintained to one viewing the film 14c from the vantage point of the lens 11a, as is true in any camera. Thus a duplicate arrow pointing from image 5 toward image 3 is drawn behind the film 14c.

Since the images 3,5 are about 0.889 inch apart, as seen in FIG. 17A, the images 3,5 will appear behind lenticulations #+44 and #—44 respectively with a 100 line screen, using the same numbering system for the lenticulations previously employed.

In order to physically spread out the boundary rays from all three objects A, B and C and illustrate their relative position, the highly compressed and distorted diagram of FIG. 18 is provided. The numbering system for the images from the various objects A, B and C is that previously adopted. It will be noticed that the central lenticule, #0, is just filled by the rays from the principal object A, which minimizes the perception of vertical lines or bands in the print previously mentioned in connection with registration.

FIG. 19 is an optical diagram drawn to the scale of the diagram of the taking camera in FIG. 17 showing a wide lens projection printing process embodying the present invention. In this diagram a wide lens instantaneous printer 20a is employed having a lens 21a of 13.85 inch focal length and an $f$/number of $f/2$. This lens will have a horizontal aperture of about 6.92 inches and a relatively small vertical aperture. The lens is chosen to accommodate the same rays that passed through the lens and onto the film of the taking camera and is shown disposed for magnification during printing of 1 to 1. The distance from the lens 21a to the camera film 14c is 27.7 inches as is the distance from the lens to the printing film or plate 14d. A lenticular screen 12e is disposed in front of the taking negative film 14c and in the example will also be a 100 line screen. A lenticular screen 12f is also mounted in front of the print film 14d as previously described and although this screen need not have the same pitch as the lenticular screen 12e, it will be assumed that this is also a 100 line screen.

A 100 line halftone screen 16 of the conventional grid type is mounted in front of the print lenticular screen 12f in order to produce isoflags in accordance with the principles previously described. In the optical diagram of FIG. 19, only the two most divergent (boundary) principal rays associated with the object B are illustrated to avoid complication of the figure. These rays originate from points 3, 5 on the taking camera negative 14c, cross at point B" in front of the film as previously described and are picked up by the outer edges of the wide lens 21a. Since the point B" is 3.15 inches in front of the camera negative 14c, the lens 21a will bring it to a focus at a point 4.05 inches in back of the print film 14d by well known optical principles. Thus, the images 3 and 5 on the camera film 14c, as directed by both lenticular screens, will form images 3a and 5a on the print film 14d, and these images will be spaced apart by a distance equal to 0.884 inch. It will be noted that the orientation of images as indicated by the small arrow at each film is maintained, the arrow running from image 5 to image 3 in the camera negative 14c and from 5a to 3a at the projection plate 14d.

If an observer's eye were placed at the lens in FIG. 17, the arrow at object B would point to the right and the right eye would see the ray images at 3. If the observer now turned around and observed the picture just taken (negative 14C) the arrow would still point to the right but now the left eye would see image 3 and object B" would appear to be in front of the picture, while the real object B was in back of the plane of principal focus containing object A. It is thus seen that the stereoscopic views are seen by the wrong eye making distant objects appear in front of the picture plane and near objects appear behind the picture plane. The picture is, therefore, pseudoscopic and if a viewer moved his head back and forth in observing the picture, he would note that foreground and background objects would move in the wrong direction relative to objects in the picture plane.

FIG. 19A is an enlarged highly diagrammatic view which is necessarily broken along the optical axis because of the scale of the drawing. This view resembles in principle the views such as FIGS. 5B and 5D illustrating operation of the scanning projection printer. It can be seen how image points 5 and 3 of the taking camera negative 14c originate from the base of lenticulations #—44 and +44 respectively and how they are focused at the base of lenticulations #—44 and +44 as image points 5a and 3a, respectively, at the plate 14d.

FIG. 20 is an axially shortened diagram drawn showing rays number 3 and 5 crossing at point B" as previously described, as well as boundary rays for image points 2 and 6 for the focal object A", and 1 and 7 for the near object C", and how they are imaged on the projection plate 14c by the printer lens 21a. The optical considerations previously described cause the image points 2 and 6 for the focal object A to cross at A" and to be brought to focus at a point A3, which is at the center of curvature of lenticulation No. 0 as previously described in connection with FIG. 5. The image points 2a and 6a and points between will just fill the central lenticulation of the screen 12f.

The image points 1 and 7 for the near object C which, as previously described appears to focus at C" behind the camera negative 14c (because of the fact that this is a pseudoscopic negative) will now be focused by the projection lens 21a at a point C3 in front of the print film 14d. The image points of the rays crossing at C3 appear as points 1a and 7a on the print film 14d. Thus, FIG. 20 shows how proper adjustment of the optical distances involved, relative to the characteristics of the projection lens 21a, converts the pseudoscopic camera negative 14c into a true steroscopic negative 14d which will be viewable in accordance with the principles previously described. It can also be seen from FIG. 20 how the wide lens 21a, properly positioned, has caused optical scanning of the camera negative 14c during projection to produce effects on the print film 14d through its lenticular screen 12f that are comparable to those produced by the small aperture mechanically scanned lens 21 of the previous embodiment of the invention.

FIG. 21 of the diagram showing how a viewer obtains a true or orthoscopic stereo effect from a print 18a made from the plate 14d to which a viewing lenticulation screen 12g has been applied, with the object C appearing at the point C3 in front of the film and the object B appearing at a point B3 behind the film as previously described.

The optical scanning provided by the wide lens instantaneous printing process illustrated in FIG. 20 produces isoflags on a print film 14d when the halftone screen 16 is disposed in front of the lenticular screen 12f in accordance with the principles previously described.

Thus, it can be seen that both the mechanical and optical scanning systems described make it possible to produce a printing plate bearing isoflags, each of which embodies stereo information across the entire width of a lenticulation, and yet can be produced using a halftone screen of commercial mesh (e.g. a 100 line screen) without need for resort to a very fine screen. Alternatively, a 200 or 300 line lenticular screen can be employed for printing press pictures made from a printing plate produced with a 100 or 200 line halftone screen. Although the process was described using lenticular and halftone screens with the same number of lines per inch for simplicity of explanation, it is not necessary to do so, and in fact it is generally preferred to use a halftone screen with either more or less lines per inch than the lenticular screen.

In FIG. 12 a halftone grid 16 has a pitch which provides one dot or aperture per lenticulation, across the screen 126. The preferred range is from ½ dot per lenticulation (coarser) to 1½ dots per lenticulation (finer). Where the halftone grid dots overlap lenticulations, those dots are formed into individual isoflags behind each of the overlapped lenticulations, although some of these isoflags will not span an entire lenticulation.

DEFINITIONS

In order to simplify the claims so that they may more clearly point out the invention, the following terms used in the claims are defined below, and incorporated by reference into the claims.

LENTICULAR SCREEN

A thin sheet of optically clear material, such as a transparent sheet of plastic or glass, and having a planar rear face or base, and a front face which is corrugated to form lenticulations or lenticules.

LENTICULATION, LENTICULE

A single element of a lenticular screen bounded at its front face by a cylindrical or other appropriate lens surface, at its rear face by a base surface forming part of the base of the entire screen, and at its sides by planes parallel to the optical axis of the cylindrical lens and intersecting the edges of the cylindrical lens. The material from which the lenticular screen is formed has an index of refraction such that objects at infinity are brought to focus by the lens at the lenticulation base.

FILM, PLATE, NEGATIVE

These terms refer to the usual sheets of glass, metal, cellulose acetate, or other flexible materials and plastics coated with a light-sensitive emulsion, developed and fixed as required within the context of the claim. The terms are not limited to the original film, etc., but include duplicates and enlargements thereof. Since commercial printing techniques vary, these terms include negatives, positives and internegatives, etc. Also, the sensitive emulsion can be applied directly to the rear face of the lenticular screens, in which case the film, plate, negative, etc., and the screen are merely handled physically as a unit.

The term "scanning" refers to the "seeing" of original objects or pictures thereof by a camera or printer lens continuously through an angle of "vision" or "seeing" whose base line is in the order of the interpupilary distance of the eyes or greater; coupled with recording the spectrum of images thus seen on a film, plate, etc., through a continuous angle. This term encompasses both optical (wide lens) scanning and mechanical scanning wherein elements of the camera or printer are moved in synchronism.

Although the best modes heretofore contemplated for carrying out the present invention have been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. The method of producing a halftone mechanical printing plate for mechanical printing copy which gives stereoscopic scenes when viewed through a lenticular screen; said method comprising the steps of projection printing a stereo picture that was taken with a lenticular screen through a projection lenticular screen of the same pitch onto a sensitive surface disposed behind a printing lenticular screen and with a double grid type halftone screen in front of the printing lenticular screen, and causing the images of objects that were in the focal plane of the stereo picture to be scanned across only one of a relatively few lenticulations of the printing lenticular screen during exposure, and simultaneously causing the images of objects that were inside the focal plane to scan across a relatively large number of the printing screen lenticulations while causing the images of the objects that were outside the focal plane to scan in the opposite direction across a relatively large number of the printing screen lenticulations, and illuminating the stereo picture while so exposing the sensitive surface so that discrete isoflags are formed on that surface behind each printing screen lenticulation by the effect of those lenticulations on the light passing through the halftone screen, with the dimensions of each portion of an individual isoflag, measured parallel to the associated lenticulation axis, being proportional to the intensity of the light emanating from the corresponding image in the stereo picture.

2. A method as defined in claim 1 which in said projection printing includes maintaining said double grid halftone screen disposed at an angle to rather than square with the lenticulations of the printing lenticular screen.

3. A method for producing a modified, stereoscopically resolvable photographic print, suitable for making a halftone mechanical printing plate, from a picture photographically made with a taking lenticular screen and containing stereoscopic image components in vertical regions corresponding to the lenticulations of the taking screen, comprising projection printing the said picture through a crossed line grid type halftone screen and a lenticular printing screen onto a surface while effectuating a scanning of the picture during exposure through a projection lenticular screen of the same pitch as that of the taking screen for causing the image components on the picture behind the lenticulations of its projection screen to form corresponding image components on the surface behind the lenticulations of its printing screen and with the dimension of each image component formed through an aperture of the halftone grid, along the adjacent lenticulation, being proportional to the intensity of the light projected through that aperture, said projection printing being effected while maintaining said halftone screen disposed at an angle to rather than square with the lenticulations of said lenticular printing screen, and said projection printing operation producing on said surface a photographic print in which the resultant composite images constitute isoflags suitable for the production of a mechanical printing plate from said last mentioned photographic print.

4. The process of claim 3, wherein the picture is scanned by synchronously moving a projection printing lens and the assemblage of the surface, printing lenticular screen and the halftone screen so that the image on the surface behind the central lenticulation of its printing lenticular screen occupies substantially the full width of that lenticulation, and corresponds to the image on the picture that is behind the central lenticulation of its projection lenticular screen.

5. A method of producing a modified, stereoscopically resolvable copy, suitable for making a halftone mechanical printing plate, from a picture that consists of parallel picture components each containing a multiplicity of parallel sets of stereo elements that are resolvable by a lenticular screen which when placed against said picture has parallel lenticular ridges in registration with said components, comprising establishing said screen in registration with said picture, illuminating said picture, and projecting light from said picture through its said screen and onto a photographically sensitive surface after passing through a second, parallel-ridged lenticular screen adjacent to said last-mentioned surface, to form images of said stereo elements on said surface, while traversing said projected light through a halftone grid as it approaches said second lenticular screen, to produce, in coaction with said second lenticular screen, said stereo element images in the form of stereoscopically resolvable, halftone image components corresponding to apertures of said grid but narrowed by said second screen and each having an elongation parallel to the screen ridges that is dependent on the intensity of the light projected for such stereo element image from the picture, for photographically constituting on said surface said modified copy of said picture, that is composed of halftone elements which are discrete continuums each consisting of one or more of said image components, and that is suitable for making a mechanical printing plate, said halftone grid being a crossed line halftone screen and said projecting operation being effected while maintaining said halftone screen disposed at an angle to rather than square with the ridges of said second lenticular screen.

6. A method as defined in claim 5, in which in the aforesaid picture the sets of stereo elements have an order transverse of each parallel picture component such that the picture is orthoscopic when stereoscopically resolved, and in which said projecting step includes optically directing the image-forming light from said stereo elements to form said stereo element images disposed in the same aforesaid order on the photographically sensitive surface, so that the produced, stereoscopically resolvable copy is orthoscopic.

7. A method as defined in claim 5, in which in the aforesaid picture the sets of stereo elements have an order transverse of each parallel picture component such that the picture is pseudoscopic when stereoscopically resolved, and in which said projecting step includes optically directing the image-forming light from said stereo elements to form said stereo element images disposed in reversed order on the photographically sensitive surface, so that the produced, stereoscopically resolvable copy is orthoscopic.

8. In a process for producing stereoscopic printing plates for mechanically printing pictures to be viewed through a vertical lenticular screen, the procedure comprising effecting a projection photographic printing from a stereoscopically resolvable photograph of a scene made from a continuous series of horizontal viewing positions and through a lenticular screen having a predetermined pitch of lenticulations and containing a multiplicity of image components behind each lenticulation, said projection printing comprising projecting light from said picture through a vertical lenticular projection screen in front of the picture and of the same pitch as the first-mentioned screen, through a printing lens, through a crossed line grid type halftone screen, through a printing lenticular screen, and onto a photographically sensitive surface, said crossed line screen being disposed at an angle to rather than square with the lenticulations of said printing lenticular screen, said projection printing being effected through essentially the same viewing angles as those from which the original photograph was taken and said projection printing being effective to produce images on the sensitive surface behind the lenticulations of said second screen corresponding to the aforesaid image components of the picture, and with the dimensions of each image component formed through apertures of said halftone screen, along corresponding lenticulations, being proportional to the intensity of the light that was projected through those apertures in each part of the projection.

References Cited

UNITED STATES PATENTS

| | | | |
|---|---|---|---|
| 2,151,301 | 3/1939 | Percy et al. | 96—45 X |
| 2,506,131 | 5/1950 | Bonnet | 355—22 |
| 3,161,509 | 12/1964 | Howe et al. | 96—40 |
| 3,332,775 | 7/1967 | Mandler | 96—40 X |
| 3,479,452 | 11/1969 | Hancock et al. | 96—40 X |
| 3,504,059 | 3/1970 | Glenn | 96—40 X |

OTHER REFERENCES

German printed application 1,136,573, September 1962 (Filippi et al.).

DAVID KLEIN, Primary Examiner

U.S. Cl. X.R.

95—18; 96—40; 101—426; 350—131; 355—33

UNITED STATES PATENT OFFICE
CERTIFICATE OF CORRECTION

Patent No. 3,666,465     Dated May 30, 1972

Inventor(s) DOUGLAS F. WINNEK

It is certified that error appears in the above-identified patent and that said Letters Patent are hereby corrected as shown below:

Col. 2, line 54, for "lens" read --lenses-- line 55, for "lens" read --lenses--

Col. 4, line 60, for "to" (second occurrence) read --of--

Col. 5, line 68, for "procduced" read --produced--

Col. 6, line 28, after "in" insert --the--

Col. 7, line 1, for "lenticulations" read --lenticulation-- line 37, delete "tions exist whether light is incident upon or emanating"

line 40, after "condi-" insert --tions exist whether light is incident upon or emanating--

Col. 20, line 13, for "wtih" read --with--

Signed and sealed this 9th day of January 1973.

(SEAL)
Attest:

EDWARD M. FLETCHER, JR.
Attesting Officer

ROBERT GOTTSCHALK
Commissioner of Patent